(12) United States Patent
Yang et al.

(10) Patent No.: US 10,065,640 B2
(45) Date of Patent: Sep. 4, 2018

(54) VEHICLE AND CRUISE CONTROL METHOD FOR THE SAME

(71) Applicant: BYD COMPANY LIMITED, Shenzhen, Guangdong (CN)

(72) Inventors: Dongsheng Yang, Shenzhen (CN); Yubo Lian, Shenzhen (CN); Jintao Zhang, Shenzhen (CN); Hongbin Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 119 days.

(21) Appl. No.: 15/215,335

(22) Filed: Jul. 20, 2016

(65) Prior Publication Data
US 2016/0325744 A1    Nov. 10, 2016

Related U.S. Application Data

(63) Continuation of application No. PCT/CN2014/089836, filed on Oct. 29, 2014.

(30) Foreign Application Priority Data

Jan. 30, 2014    (CN) .......................... 2014 1 0044581

(51) Int. Cl.
*B60W 10/06* (2006.01)
*B60W 10/08* (2006.01)
(Continued)

(52) U.S. Cl.
CPC ............. *B60W 30/14* (2013.01); *B60K 6/387* (2013.01); *B60K 6/442* (2013.01); *B60K 6/445* (2013.01);
(Continued)

(58) Field of Classification Search
CPC ...... B60W 10/06; B60W 10/08; B60W 20/10; B60W 30/14
See application file for complete search history.

(56) References Cited

U.S. PATENT DOCUMENTS

| 8,727,939 B2 * | 5/2014 | Chen | ...................... | B60K 6/442 477/5 |
| 2010/0063661 A1 * | 3/2010 | Saito | ...................... | B60K 6/445 701/22 |
| 2013/0245912 A1 * | 9/2013 | Boot | ........................ | B60K 6/48 701/93 |

FOREIGN PATENT DOCUMENTS

| CN | 201214410 Y | 4/2009 |
| CN | 101909912 B | 5/2013 |
| (Continued) |

OTHER PUBLICATIONS

International Search Report and Written Opinion for Application No. PCT/CN2014/089836, dated Jan. 28, 2015, 12 pages.

*Primary Examiner* — Kimberly Sue Berona
*Assistant Examiner* — Anshul Sood

(57) ABSTRACT

The present disclosure discloses a cruise control method for a vehicle. The vehicle includes an engine unit, a transmission unit, a first motor generator, an output unit, a power switching device, a second motor generator, and a power battery. The cruise control method includes the following steps: when a signal for a vehicle to enter cruise control is detected, determining whether the vehicle meets a preset cruise control condition; and if the vehicle meets the preset cruise control condition, controlling the vehicle according to a current operating mode of the vehicle to enter a corresponding cruise mode, where when the current operating mode of the vehicle is an EV mode, the vehicle is controlled to enter an EV cruise mode, and when the current operating mode of the vehicle is an HEV mode, the vehicle is
(Continued)

controlled to enter an HEV cruise mode. The present disclosure further discloses a vehicle.

20 Claims, 22 Drawing Sheets

(51) Int. Cl.
  *B60W 10/26*   (2006.01)
  *B60W 30/14*   (2006.01)
  *B60K 6/387*   (2007.10)
  *B60K 6/442*   (2007.10)
  *B60K 6/445*   (2007.10)
  *B60W 50/02*   (2012.01)
  *B60W 10/113*   (2012.01)
  *B60W 20/10*   (2016.01)
  *B60W 20/11*   (2016.01)
  *B60W 50/029*   (2012.01)

(52) U.S. Cl.
  CPC ............ *B60W 10/06* (2013.01); *B60W 10/08* (2013.01); *B60W 10/113* (2013.01); *B60W 10/26* (2013.01); *B60W 20/10* (2013.01); *B60W 20/11* (2016.01); *B60W 30/143* (2013.01); *B60W 50/0205* (2013.01); *B60K 2310/242* (2013.01); *B60W 2050/0295* (2013.01); *B60W 2510/186* (2013.01); *B60W 2510/244* (2013.01); *B60W 2520/10* (2013.01); *B60W 2540/10* (2013.01); *B60W 2540/12* (2013.01); *B60W 2540/16* (2013.01); *B60W 2550/142* (2013.01); *B60W 2550/143* (2013.01); *B60W 2710/0666* (2013.01); *B60W 2710/083* (2013.01); *Y02T 10/6234* (2013.01); *Y02T 10/6239* (2013.01); *Y02T 10/6286* (2013.01)

(56) References Cited

FOREIGN PATENT DOCUMENTS

| JP | 2007-118751 A | 5/2007 |
|---|---|---|
| KR | 10-0887797 B1 | 3/2009 |

\* cited by examiner

_US 10,065,640 B2_

VEHICLE AND CRUISE CONTROL METHOD FOR THE SAME

CROSS-REFERENCE TO RELATED APPLICATIONS

This application is a continuation application of International Application No. PCT/CN2014/089836, filed on Oct. 29, 2014, which is based on and claims priority to and benefits of Chinese Patent Application Serial No. 201410044581.9, filed with the State Intellectual Property Office of P. R. China on Jan. 30, 2014. The entire contents of the above-referenced applications are incorporated herein by reference.

FIELD

The present disclosure relates to the technical field of vehicles, and more particularly to a cruise control method for a vehicle and a vehicle.

BACKGROUND

To reduce energy consumption, development and utilization of energy-efficient vehicles have become a trend. As an energy-efficient vehicle, a vehicle is driven by at least one of an engine and a motor and has various operation modes, and consequently may operate with improved transmission efficiency and fuel economic efficiency.

However, in the related art, the power transmission system in the vehicle is generally complex in structure, bulky, low in transmission efficiency, and complicated in control strategy. For example, a plurality of gear shift actuating components needs to be controlled simultaneously during the gear shifting or mode switching. An improvement needs to be made.

SUMMARY

Embodiments of the present disclosure seek to solve at least one of the problems existing in the related art to at least some extent.

Embodiments of the present disclosure provide a cruise control method for a vehicle, which can overcome deficiencies in the prior art, and implement combination of selection of a driving mode and an automatic cruise function for running at a constant speed, so as to meet different driving requirements of drivers, and bring convenience to driving while fuel consumption can be reduced.

Another objective of the present disclosure is to provide a vehicle.

To achieve the foregoing objectives, an embodiment of an aspect of the present disclosure provides a cruise control method for a vehicle. The vehicle includes an engine unit, a transmission unit adapted to selectively couple with the engine unit and also configured to transmit the power generated by the engine unit, a first motor generator coupled with the transmission unit, an output unit, a power switching device, a second motor generator configured to drive front wheels and/or rear wheels, and a power battery supplying power to the first motor generator and/or the second motor generator. The output unit is configured to transmit the power transmitted by the transmission unit to at least one of the front and rear wheels of the vehicle, and the power switching device is adapted to enable or interrupt power transmission between the transmission unit and the output unit. The cruise control method includes the following steps: when a signal for the vehicle to enter cruise control is detected, determining whether the vehicle meets a preset cruise control condition; and if the vehicle meets the preset cruise control condition, controlling the vehicle according to a current operating mode of the vehicle to enter a corresponding cruise mode, where when the current operating mode of the vehicle is an electric vehicle (EV) mode, the vehicle is controlled to enter an EV cruise mode, and when the current operating mode of the vehicle is a hybrid electric vehicle (HEV) mode, the vehicle is controlled to enter an HEV cruise mode.

In some embodiments of the present disclosure, combination of selection of a driving mode and an automatic cruise function for running at a constant speed is implemented, so as to meet different driving requirements of drivers, and bring convenience to driving while fuel consumption can be reduced, making it more economical and environmentally friendly. Moreover, power output by the engine unit and/or a first motor generator may be output to an output unit via a power switching device, and the output unit then outputs the power to at least one of front and rear wheels of the vehicle. Meanwhile, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

To achieve the foregoing objectives, an embodiment of another aspect of the present disclosure provides a vehicle, including: an engine unit; a transmission unit, where the transmission unit is adapted to selectively couple with the engine unit and also configured to transmit the power generated by the engine unit; a first motor generator, where the first motor generator is coupled with the transmission unit; an output unit, where the output unit is configured to transmit the power transmitted by the transmission unit to at least one of the front and rear wheels of the vehicle; a power switching device, where the power switching device is adapted to enable or interrupt power transmission between the transmission unit and the output unit; a second motor generator, where the second motor generator is configured to drive the front wheel or the rear wheel; a power battery, where the power battery is connected to the first motor generator and/or the second motor generator to supply power to the first motor generator and/or the second motor generator; and a controller, where when a signal for the vehicle to enter cruise control is detected, the controller determines whether the vehicle meets a preset cruise control condition, and when the vehicle meets the preset cruise control condition, the controller controls the vehicle according to a current operating mode of the vehicle to enter a corresponding cruise mode, where when the current operating mode of the vehicle is an EV mode, the controller controls the vehicle to enter an EV cruise mode, and when the current operating mode of the vehicle is an HEV mode, the controller controls the vehicle to enter an HEV cruise mode.

According to some embodiments of the present disclosure, combination of selection of a driving mode and an automatic cruise function for running at a constant speed is implemented, so as to meet different driving requirements of drivers, and bring convenience to driving while fuel consumption can be reduced, making it more economical and environmentally friendly. Moreover, power output by the engine unit and/or a first motor generator may be output to an output unit via a power switching device, and the output unit then outputs the power to at least one of front and rear wheels of the vehicle. Meanwhile, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
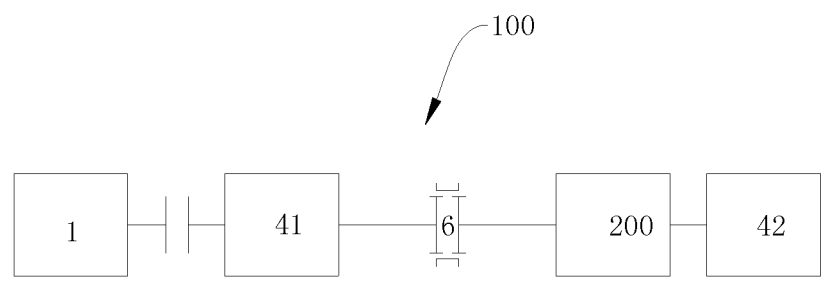
FIG. 1 is a schematic diagram of a power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

A power transmission system 100 according to embodiments of the present disclosure will be described in detail below with reference to FIGS. 1-19. The power transmission system 100 is applicable to a vehicle, such as a hybrid vehicle with an engine unit 1 and a motor generator.

As shown in the figures, the power transmission system 100 according to embodiments of the present disclosure may include an engine unit 1, a transmission unit 2a, a first motor generator 41, a second motor generator 42, an output unit 5, and a power switching device (e.g., a synchronizer 6, and a clutch 9).

The transmission unit 2a is adapted to be selectively coupled with the engine unit 1. The engine unit 1 may selectively output a power generated by the engine unit 1 to the transmission unit 2a via the clutch 9 or the like. Alternatively, the transmission unit 2a may also output, for example, a starting torque from the first motor generator 41 to the engine unit 1, so as to start the engine unit 1. In the context of the present disclosure, the phrase "the transmission unit 2a is coupled with the engine unit 1" means that the power can be transferred between the engine unit 1 and the transmission unit 2a directly or via other components, and the coupling between the transmission unit 2a and the engine unit 1 is also referred to as a power coupling.

The engine unit 1 generates energy by mixing liquid or gaseous fuel and air and then combusting the mixed fuel and air therein, and the energy is converted into mechanical energy. The engine unit 1 of the vehicle may generally adopt a four-stroke gasoline or diesel engine. The engine unit 1 may generally include a block, a crank-connecting rod mechanism, a valve mechanism, a supply system, an ignition system, a cooling system, a lubrication system and the like.

The block is an assembled body of individual mechanisms and systems of the engine unit 1. The crank-connecting rod mechanism may convert the linear reciprocating motion of a piston into the rotary motion of a crankshaft, and output a drive force. The valve mechanism is configured to charge or discharge a gas at a predetermined time, so as to ensure the smooth performing of each cycle of the engine unit 1. The supply system may supply a mixture of oil and gas to a cylinder for combustion. The cooling system is configured to cool the engine unit 1, so as to ensure that the operating temperature of the engine unit 1 is within a suitable temperature range. The lubrication system is configured to lubricate individual motion pairs in the engine unit 1, so as to reduce the wear and energy loss.

It would be appreciated that the foregoing engine unit 1 as well as specific structures and operation principles of individual sub-systems and sub-mechanisms of the engine unit 1 are well known to those skilled in the art, so the detailed description thereof will be omitted here for clarity purpose.

The first motor generator 41 is coupled with the transmission unit 2a. In other words, the first motor generator 41 cooperates with the transmission unit 2a to transmit the power. That is, the first motor generator 41 may drive the transmission unit 2a, while the transmission unit 2a may drive the first motor generator 41.

For example, the engine unit 1 may output at least a part of the power generated thus to the first motor generator 41 via the transmission unit 2a, and the first motor generator 41 may generate electricity and convert mechanical energy into electric energy to be stored in an energy storage component such as a battery component. As another example, the first motor generator 41 may convert electric energy from the battery component into mechanical energy, and output the mechanical energy to the output unit 5 via the transmission unit 2a to drive the vehicle.

The first motor generator 41 is a motor having functions of both a motor and a generator. As used in the present disclosure, the term "motor generator" refers to a motor having functions of both a motor and a generator, unless specified otherwise.

The output unit 5 is configured to transmit a power transmitted by the transmission unit 2a to wheels 200 (e.g., one of front and rear wheels 210 and 220) of the vehicle. The output unit 5 is adapted to output the power from the transmission unit 2a.

The power switching device such as the synchronizer 6 is adapted to enable or interrupt a power transmitting between the output unit 5 and the transmission unit 2a. In other words, the power switching device may output the power output from the transmission unit 2a to at least one of front and rear wheels 210, 220 via the output unit 5, or the power switching device may also disconnect the transmission unit 2a from the output unit 5 and the transmission unit 2a may not output the power to the front and/or rear wheels 210, 220 via the output unit 5 directly.

As shown in FIGS. 1-13, the second motor generator 42 is configured to drive the front and/or rear wheels 210, 220.

Therefore, when the output unit 5 is configured to drive the front wheels 210 and the second motor generator 42 is also configured to drive the front wheels 210, the vehicle having the power transmission system 100 may be operable as a two-wheel drive vehicle. When the output unit 5 is configured to drive the front wheels 210 and the second motor generator 42 is configured to drive the rear wheels 220, the vehicle having the power transmission system 100 may be operable as a four-wheel drive vehicle, and may switch between a two-wheel drive mode and a four-wheel drive mode. When the output unit 5 is configured to drive the front wheels 210 and the rear wheels 220 and the second motor generator 42 is configured to drive the front wheels 210 or the rear wheels 220, the vehicle having the power transmission system 100 may be operable as a four-wheel drive vehicle.

With the power transmission system 100 according to embodiments of the present disclosure, the power output by at least one of the engine unit 1 and the first motor generator 41 may be output to the output unit 5 via the power switching device, and then output by the output unit 5 to the front and/or rear wheels 210, 220 of the vehicle.

Meanwhile, because of the provision of the second motor generator 42, the second motor generator 42 may compensate for the torque of the front wheels 210 or the rear wheels 220, and may also cooperate with the engine unit 1 and the first motor generator 41 to drive the vehicle, thus increasing the number of operation modes of the vehicle. Therefore, the vehicle may be adapted to different operating conditions, thus achieving better fuel economic efficiency while reducing the emission of harmful gases.

In some embodiments of the present disclosure, as shown in FIGS. 1-16, the power switching device is configured as a synchronizer 6, and the synchronizer 6 is adapted to selectively synchronize between the output unit 5 and the transmission unit 2a, so as to output the power via the output unit 5 to drive the wheels 200 of the vehicle.

The function of the synchronizer 6 may be to eventually synchronize the output unit 5 and the transmission unit 2a, i.e., under the action of the synchronizer 6, the output unit 5 and the transmission unit 2a may operate synchronously, such that the power from the transmission unit 2a may be output with the output unit 5 as a power output terminal. However, when the transmission unit 2a and the output unit 5 are not synchronized by the synchronizer 6, the power from the transmission unit 2a may not be output to the wheels 200 via the output unit 5 directly.

The synchronizer 6 functions to switch the power. That is, when the synchronizer 6 is in an engaged state, the power from the transmission unit 2a may be output via the output unit 5 to drive the wheels 200; and when the synchronizer 6 is in a disengaged state, the transmission unit 2a may not transmit the power to the wheels 200 via the output unit 5. In this way, by controlling the synchronizer 6 to switch between the engaged state and the disengaged state, the switching of the drive mode of the vehicle may be realized.

Because of special application scenarios, the synchronizer 6 has the following advantages.

a. When the synchronizer 6 is in a disengaged state, the power transmitting between the engine unit 1, the transmission unit 2a, the first motor generator 41 and the wheels 200 can be severed, such that operations such as electricity generation, driving, and power/torque transmission may not influence each other, which is very important in reducing the energy consumption of the vehicle. The synchronizer 6 may meet this requirement well, while incomplete separation of friction plates usually occurs in the clutch, thus increasing the friction loss and energy consumption.

b. When the synchronizer 6 is in an engaged state, the synthesized (coupled) driving force of the engine unit 1 and the first motor generator 41 can be transferred to the wheels 200 after the torque multiplication of the transmission unit 2a, or the driving force of the wheels 200 can be transferred to the first motor generator 41 to generate electricity, both of which require that the power coupling device transmit a large torque and have high stability. The synchronizer 6 may meet this requirement well. However, if a clutch is used, an oversize clutch which does not match with the entire system (including an engine, a transmission, a motor, etc.) needs to be designed, thus increasing the arrangement difficulty, the weight and the cost, and having the risk of slipping under the action of an impact torque.

Moreover, the first motor generator 41 may adjust the speed of the transmission unit 2a, for example, the first motor generator 41 may adjust the speed of the transmission unit 2a with the rotating speed of the output unit 5 as a target value, so as to match the speed of the transmission unit 2a with the speed of the output unit 5 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle. Furthermore, the power transmission system 100 according to embodiments of the present disclosure is compact in structure and easy to control.

In some embodiments of the present disclosure, as shown in FIGS. 2-7, the transmission unit 2a includes a transmission power input part 21a and a transmission power output part 22a. The transmission power input part 21a is selectively engaged with the engine unit 1 to transmit the power generated by the engine unit 1. The transmission power output part 22a is configured to output the power from the transmission power input part 21a to the output unit 5 via the synchronizer 6.

As shown in FIGS. 2-7, the transmission power input part 21a further includes an input shaft (e.g., a first input shaft 21, a second input shaft 22) and a driving gear 25 mounted on the input shaft. The input shaft is selectively engaged with the engine unit 1 to transmit the power generated by the engine unit 1. In other words, when the engine unit 1 needs to output the power to the input shaft, the engine unit 1 may be engaged with the input shaft, such that the power output by the engine unit 1 may be transferred to the input shaft. The engagement between the engine unit 1 and the input shaft may be achieved by means of a clutch (e.g., a dual clutch 31), which will be described in detail below, and is no longer elaborated herein.

As shown in FIGS. 2-7, the transmission power output part 22a includes an output shaft 24, and a driven gear 26 mounted on the output shaft 24 and configured to mesh with the driving gear 25 on the input shaft.

As shown in FIGS. 2-5, the output shaft 24 is configured to output at least a part of the power transmitted by the input shaft. The output shaft 24 and the input shaft cooperate with each other to transmit the power. For example, preferably, the power transmission between the output shaft 24 and the input shaft may be realized by means of the driving gear 25 and the driven gear 26.

It would be appreciated that the power transmission between the output shaft 24 and the input shaft is not limited to this. For example, the power transmission between the output shaft 24 and the input shaft may also be realized by means of a belt transmission mechanism, a rack and pinion transmission mechanism or the like. For example, a suitable structure and manner of may be specifically selected according to practical applications by a person skilled in the art.

The output shaft 24 is configured to transmit at least a part of the power on the input shaft. For example, when the power transmission system 100 is in a certain transmission mode where for example, the first motor generator 41 generates electricity, a part of the power on the input shaft may be used for the electricity generating of the first motor generator 41, and the other part of the power on the input shaft may be used to drive the vehicle to run. Certainly, all power on the input shaft may be used for the electricity generation of the first motor generator 41.

In some embodiments of the present disclosure, the power transmitting between the first motor generator 41 and one of the input shaft and the output shaft 24 may be direct or indirect. As used herein, the term "direct power transmission" means that the first motor generator 41 is directly coupled with a corresponding one of the input shaft and the output shaft 24 for power transmission, without using any intermediate transmission components such as a speed changing device, a clutch device, or a transmission device. For example, an output terminal of the first motor generator 41 can be directly and rigidly connected with one of the input shaft and the output shaft 24. The direct power transmission has the advantages of eliminating the intermediate transmission components and reducing the energy loss during the power transmission.

As used herein, the term "indirect power transmission" refers to any other power transmission manners other than the direct power transmission, for example, the power transmission by means of intermediate transmission components such as a speed changing device, a clutch device, or a transmission device. The indirect power transmission has the advantages of enabling convenient arrangement and achieving the desired transmission ratio by providing a speed changing device and the like.

The output unit 5 may be used as a power output terminal of the output shaft 24 for outputting the power on the output shaft 24. The output unit 5 and the output shaft 24 may rotate differentially and not synchronously. In other words, there can be a rotating speed difference between the output unit 5 and the output shaft 24, and the output unit 5 and the output shaft 24 are not rigidly fixed with each other.

The synchronizer 6 is disposed on the output shaft 24. As shown in FIGS. 1-6, the synchronizer 6 may include a splined hub 61 and a synchronizing sleeve 62. The splined hub 61 may be fixed on the output shaft 24 such that the splined hub 61 can rotate synchronously with the output shaft 24, while the synchronizing sleeve 62 may move in an axial direction of the output shaft 24 relative to the splined hub 61 so as to selectively engage with the output unit 5, such that the output unit 5 can rotate synchronously with the output shaft 24. In this way, the power may be transferred from the output unit 5 to the front and/or rear wheels 210, 220, thus driving the wheels 200. However, it would be appreciated that the structure of the synchronizer 6 is not limited to this.

With the power transmission system 100 according to embodiments of the present disclosure, the power output by at least one of the engine unit 1 and the first motor generator 41 may be output from the output unit 5 by the engagement of the synchronizer 6, such that the power transmission system 100 is compact in structure and easy to control. Moreover, during the switching of the operating modes of the vehicle, it is possible for the synchronizer 6 to switch from a disengaged state to an engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss, and realizing no torque engagement of the synchronizer 6. Furthermore, the radial frictional force is much smaller than the average value in the related art or even there is no radial frictional force during the engagement of the synchronizer 6.

In some embodiments of the present disclosure, the output unit 5 is configured to drive a first pair of wheels of the vehicle, and there is a pair of second motor generators 42 configured to drive the first pair of wheels. Further, there may be a plurality of second motor generators. For example, the power transmission system 100 further includes a third motor generator 43 configured to drive a second pair of wheels of the vehicle. For example, as shown in FIGS. 2-8, the first pair of wheels refers to the front wheels 210 of the vehicle, and the second pair of wheels refers to the rear wheels 220 of the vehicle. It is understood that in other embodiments, the first pair of wheels can refer to the rear wheels 220 and the second pair of wheels can refer to the front wheels 210.

Therefore, the power transmission system 100 according to embodiments of the present disclosure has four types of power output sources, i.e. the engine unit 1, the first motor generator 41, the second motor generator 42 and the third motor generator 43, in which the engine unit 1, the first motor generator 41 and the second motor generator 42 may be configured to drive one pair of wheels of the vehicle, and the third motor generator 43 may be configured to drive the other pair of wheels of the vehicle. Therefore, the vehicle having the power transmission system 100 is operable as a four-wheel drive vehicle.

Moreover, during the switching of operating modes of the vehicle, it is possible for the synchronizer 6 to switch from the disengaged state to the engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss.

Meanwhile, by the provision of the second motor generator 42 and the third motor generator 43, the second motor generator 42 and the third motor generator 43 may compensate for the torque of the wheels 200, which is indirectly reflected in the output of the output unit 5. That is, the second motor generator 42 and the third motor generator 43 may indirectly adjust the rotating speed of the output unit 5. For example, when the synchronizer 6 switches from the disengaged state to the engaged state, the second motor generator 42 and the third motor generator 43 may indirectly adjust the rotating speed of the output unit 5 according to requirements, so as to match the rotating speed of the output shaft 24 with the rotating speed of the output unit 5 in a short time, thus facilitating the engagement of the synchronizer 6.

Furthermore, the second motor generator 42 and the third motor generator 43 may cooperate with the first motor generator 41 to adjust the rotating speed of the output unit 5 simultaneously, so as to synchronize the rotating speed of the output shaft 24 and the rotating speed of the output unit 5 in a shorter time, thus facilitating the engagement of the synchronizer 6 and greatly improving the transmission efficiency.

Optionally, the first motor generator 41 may adjust the rotating speed of the output unit 5 separately. Alternatively, optionally, at least one of the second motor generator 42 and the third motor generator 43 may adjust the rotating speed of the output unit 5 separately. Furthermore, optionally, the first motor generator 41, the second motor generator 42 and the third motor generator 43 may adjust the rotating speed of the output unit 5 simultaneously.

In this way, the output of the power from the transmission unit 2a may be controlled by the engagement/disengagement of the synchronizer 6, and when the synchronizer 6 switches from the disengaged state to the engaged state, at least one of the first motor generator 41, the second motor generator 42 and the third motor generator 43 may compensate for the speeds of the output shaft 24 and the output unit 5, so as to match the rotating speed of the output shaft 24 with the rotating speed of the output unit 5 rapidly, thus realizing no torque engagement of the synchronizer 6 rapidly.

In some embodiments of the present disclosure, as shown in FIGS. 2-9, there is a plurality of the input shafts, i.e. two or more input shafts. The input shafts are coaxially and sequentially nested. For example, if there are N input shafts, the $K^{th}$ input shaft is fitted over the $(K-1)^{th}$ input shaft, where $N \geq K \geq 2$, and central axes of the N input shafts coincide with each other.

For example, as shown in FIGS. 2-7 and 9-19, when there are two input shafts, e.g. the first input shaft 21 and the second input shaft 22, the second input shaft 22 is fitted over the first input shaft 21 and central axes of the two input shafts coincide with each other. As another example, as shown in FIG. 8, when there are three input shafts, e.g. the first input shaft 21, the second input shaft 22 and a third input shaft 23, the third input shaft 23 is fitted over the second input shaft 22, the second input shaft 22 is fitted over the first input shaft 21, and central axes of the three input shafts coincide with each other.

When the engine unit 1 transmits the power to the input shaft or is coupled with the input shaft for power transmitting, the engine unit 1 may be selectively engaged with one of the input shafts. In other words, when the power from the engine unit 1 needs to be output, the output terminal of the engine unit 1 may be engaged with one of the input shafts, so as to rotate synchronously with the one of the input shafts. When the engine unit 1 does not need to operate or the engine unit 1 is idle, the engine unit 1 may be disconnected from individual input shafts respectively, i.e. the engine unit 1 is not coupled with any input shaft, so as to interrupt the power transmission between the engine unit 1 and individual input shafts.

Further, as shown in FIGS. 2-6, one driving gear 25 is fixed on each input shaft, and the driving gear 25 rotates synchronously with the input shaft. The fixing between the driving gear 25 and the corresponding input shaft is not limited here, for example, the driving gear 25 and the corresponding input shaft may be fixed by, for example, key fit or hot pressing, or may be formed integrally, as long as the synchronous rotation of the driving gear 25 and the corresponding input shaft is ensured.

A plurality of driven gears 26 is fixed on the output shaft 24, and the driven gears 26 rotate synchronously with the output shaft 24. By way of example and without limitation, the fixing between the driven gear 26 and the output shaft 24 may be realized by key fit or hot pressing, or may be formed integrally.

However, the present disclosure is not limited to this. For example, the number of the driving gears 25 on each input shaft is not limited to one, and accordingly a plurality of driven gears 26 is fixed on the output shaft 24 to form a plurality of gears, which is implementable to a person skilled in the art.

As shown in FIGS. 2-6, the driven gears 26 are configured to mesh with the driving gears 25 on the input shafts respectively. In one embodiment of the present disclosure, the number of the driven gears 26 may be the same as that of the input shafts. For example, when there are two driven gears 26, there are two input shafts, such that the two driven gears 26 may be configured to mesh with the driving gears 25 on the two input shafts to transmit the power, so as to make the two pairs of gears form two gears for power transmitting.

In an embodiment of the present disclosure, three or more input shafts may be provided according to the power transmitting requirements, and each input shaft may be provided with one driving gear 25. Therefore, the larger the number of the input shafts, the larger the number of the gears is, and the wider range of the transmission ratio of the power transmission system 100 is, so as to adapt to the power transmitting requirements of various vehicles.

In some specific embodiments of the present disclosure, as shown in FIGS. 2-7, the input shafts include the first input shaft 21 and the second input shaft 22. The second input shaft 22 is fitted over the first input shaft 21. The second input shaft 22 is a hollow shaft, and the first input shaft 21 is preferably a solid shaft. Alternatively, the first input shaft 21 may also be a hollow shaft.

The first input shaft 21 may be supported by bearings. For example, a plurality of bearings can be preferably disposed in an axial direction of the first input shaft 21 at a position not influencing the assembly of other components. Similarly, the second input shaft 22 may also be supported by bearings.

Further, as shown in FIGS. 2-7, a dual clutch 31 is disposed between the engine unit 1 and the first and second input shafts 21, 22. The dual clutch 31 may be a dry dual clutch 31 or a wet dual clutch 31.

The dual clutch 31 has an input terminal 313, a first output terminal 311 and a second output terminal 312. The engine unit 1 is connected to the input terminal 313 of the dual clutch 31. The engine unit 1 may be connected to the input terminal 313 of the dual clutch 31 via for example, a flywheel, a damper, or a torsion plate.

The first output terminal 311 of the dual clutch 31 is connected to and rotates synchronously with the first input shaft 21. The second output terminal 312 of the dual clutch 31 is connected to and rotates synchronously with the second input shaft 22.

The input terminal 313 of the dual clutch 31 may be a shell of the dual clutch 31, and the first output terminal 311 and the second output terminal 312 of the dual clutch 31 may be two driven discs. Generally, the shell may be disconnected from the two driven discs, such that the input terminal 313 is disconnected from the first output terminal 311 and the second output terminal 312. When one driven disc needs to be engaged, the shell can be controlled to engage with the corresponding driven disc to rotate synchronously with the driven disc, e.g. the input terminal 313 is engaged with one of the first output terminal 311 and the second output terminal 312, such that the power transmitted from the input terminal 313 may be output via one of the first output terminal 311 and the second output terminal 312. Generally, the shell is engaged with one driven disc at a time.

It would be appreciated that the specific engagement of the dual clutch 31 is influenced by a control strategy. For a person skilled in the art, the control strategy may be adaptively set according to the desired power transmission mode, e.g. switching between a mode in which the input terminal 313 is disconnected from the first output terminal 311 and the second output terminal 312 and a mode in which the input terminal 313 is engaged with one of the first output terminal 311 and the second output terminal 312.

For example, as shown in FIGS. 2-7, since the input shaft has a concentric dual-shaft structure and each input shaft is provided with only one driving gear 25, the transmission unit 2a has two different gears, and the engine unit 1 may output the power to the output unit 5 via the two gears, while the synchronizer 6 is always in an engaged state to engage the output shaft 24 with the output unit 5.

During the gear shift, unlike the synchronizer in the related art, the synchronizer 6 does not need to be first disengaged and then move axially to engage with other gears. Only the engagement/disengagement of the dual clutch 31 needs to be controlled, while the synchronizer 6 can remain in the engaged state. In this way, when the engine unit 1 outputs the power to the output unit 5, only one gear shift actuating component, e.g. the dual clutch 31, needs to be controlled, while the synchronizer 6 does not need to be controlled, thus simplifying the control strategy greatly, reducing the number of engagement/disengagement times of, e.g. synchronizer 6, and extending the life of the synchronizer 6.

In some embodiments of the present disclosure, the first motor generator 41 is configured to cooperate with one of the driving gear 25 and the driven gear 26 for power transmission. In other words, indirect power transmission between the first motor generator 41 and one of the input shaft and the output shaft 24 is performed.

Further, as an optional solution, an intermediate transmission mechanism may be disposed between the first motor generator 41 and the corresponding gear, and by way of example and without limitation, the intermediate transmission mechanism may be a worm and worm gear transmission mechanism, a one-stage or multi-stage gear pair transmission mechanism, or a chain wheel transmission mechanism, or may be a combination of the above transmission mechanisms in the case of no conflicting. In this way, the first motor generator 41 may be provided in different locations as needed, thus reducing the arrangement difficulty of the first motor generator 41.

Figure 2:
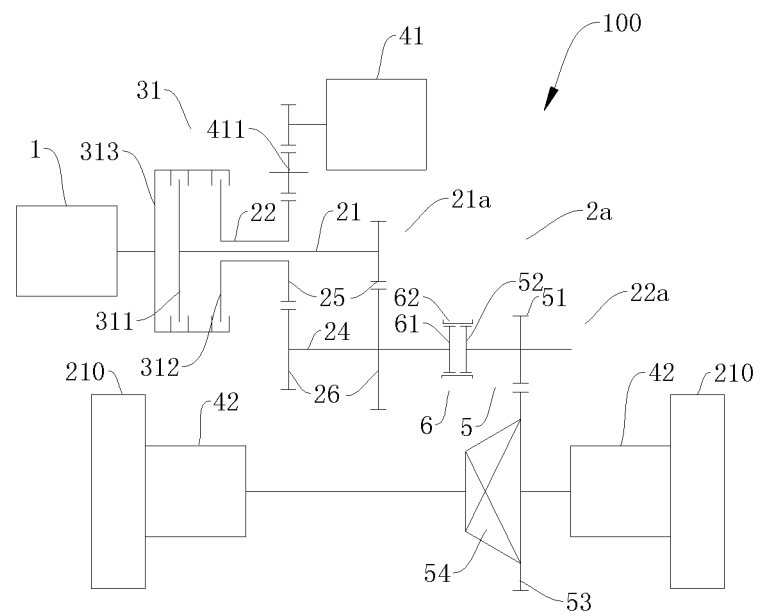
FIG. 2 is a schematic view of a power transmission system according to an embodiment of the present disclosure.
Figure 3:
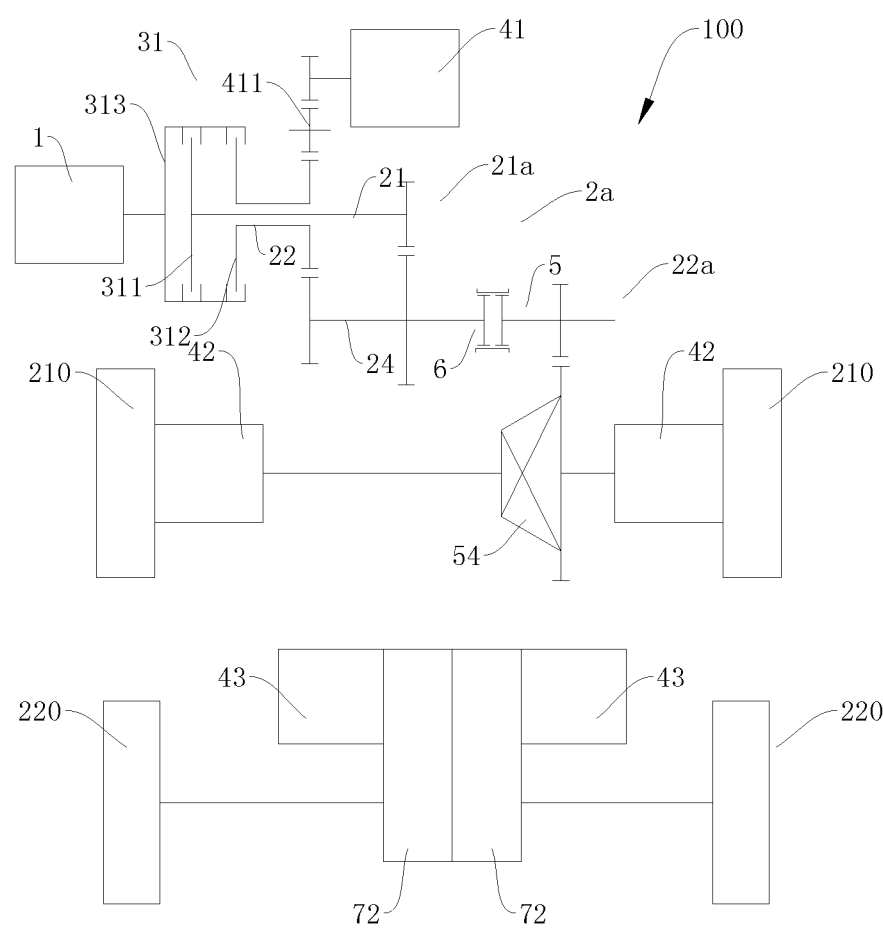
FIG. 3 is a schematic view of a power transmission system according to another embodiment of the present disclosure.

In order to facilitate the spatial arrangement, in an embodiment of the present disclosure, the first motor generator 41 may transmit the power via an intermediate gear 411. For example, as shown in FIG. 3 (with reference to FIG. 2), indirect power transmission between the first motor generator 41 and the driving gear 25 on the first input shaft 21 via the intermediate gear 411 can be performed. As another example, as shown in FIG. 2, indirect power transmission between the first motor generator 41 and the driving gear 25 on the second input shaft 22 via the intermediate gear 411 can be performed However, the present disclosure is not limited to this. In another embodiment, the first motor generator 41 may be configured to connect with one of the first input shaft 21 and the output shaft 24. For example, the first motor generator 41 may be configured to directly connect with the first input shaft 21. As another example, the first motor generator 41 may be configured to directly connect with the output shaft 24. Direct connection between the first motor generator 41 and the corresponding shaft may make the structure of the power transmission system 100 more compact, and decrease the circumferential dimension of the power transmission system 100, such that the power transmission system 100 may be easily disposed in a compartment of the vehicle.

Figure 4:
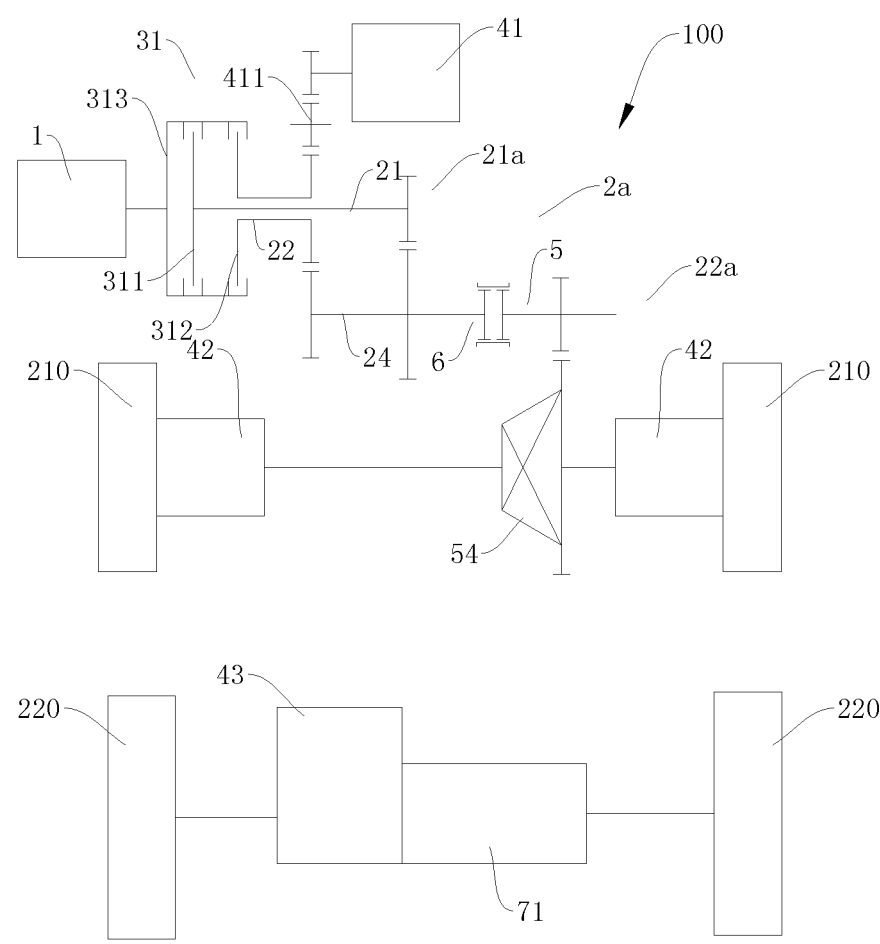
FIG. 4 is a schematic view of a power transmission system according to still another embodiment of the present disclosure.

In an embodiment of the present disclosure, as shown in FIG. 4, the first motor generator 41 is arranged coaxially with the first input shaft 21, and the first motor generator 41 is arranged coaxially with the engine unit 1. "The first motor generator 41 is arranged coaxially with the engine unit 1" would be appreciated as that a rotation axis of a rotor of the first motor generator 41 substantially coincides with a rotation axis of a crankshaft of the engine unit 1. Therefore, the power transmission system 100 becomes more compact in structure.

In some embodiments of the present disclosure, as shown in FIGS. 2-6, the output unit 5 may include an output gear 51 and an engagement gear ring 52. The output gear 51 may rotate relative to the output shaft 24, i.e. rotate differentially relative to the output shaft 24, and the engagement gear ring 52 is fixedly connected with the output gear 51, i.e. the engagement gear ring 52 rotates synchronously with the output gear 51.

Therefore, when the synchronizer 6 needs to engage the output unit 5 with the output shaft 24, the synchronizing sleeve 62 of the synchronizer 6 may axially move toward the engagement gear ring 52, and after the rotating speed of the output unit 5 is synchronized with the rotating speed of the output shaft 24, the synchronizing sleeve 62 may be engaged with the engagement gear ring 52 to form a rigid connection between the output shaft 24, the synchronizer 6 and the output unit 5, so as to rotate the output shaft 24, the synchronizer 6 and the output unit 5 synchronously.

In order to reduce the number of intermediate transmission components, to reduce the energy loss, and to enhance the transmission efficiency of the power transmission system 100, in a preferred manner, as shown in FIGS. 2-6, the output gear 51 may be a driving gear of a final drive and is configured to directly mesh with a driven gear 53 of the final drive to output the power, so as to drive the wheels 200. However, the present disclosure is not limited to this, and other intermediate transmission components may also be disposed between the output gear 51 and the final drive.

As shown in FIGS. 2-10, a differential 54 is disposed between the first pair of wheels such as the front wheels 210. The differential 54 cooperates with the output unit 5 for power transmitting. In some embodiments, the differential 54 is provided with the driven gear 53 thereon, and the output gear 51 becomes the driving gear of the final drive configured to mesh with the driven gear 53 of the final drive, such that the power may be transferred to the two front wheels 210 via the driving gear of the final drive, the driven gear 53 of the final drive and the differential 54 sequentially.

The function of the differential 54 is to properly distribute the power to the two front wheels 210. The differential 54 may be a gear differential, a mandatory locking differential, or the Torsen differential, which may be selected by a person skilled in the art according to different vehicles.

Figure 5:
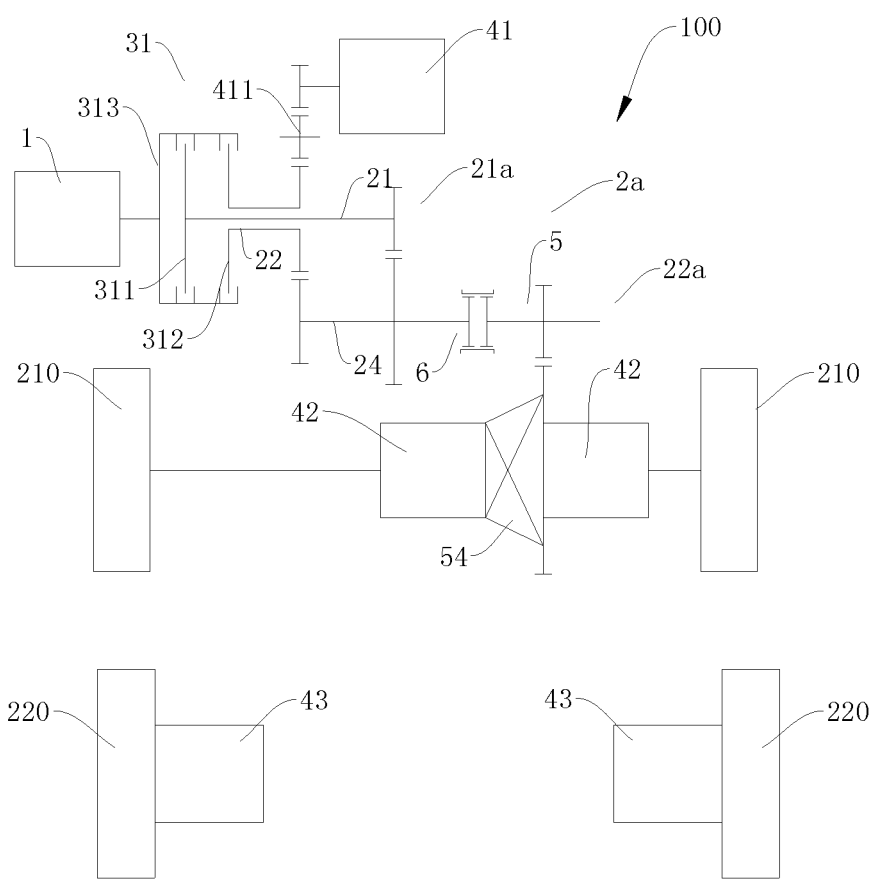
FIG. 5 is a schematic view of a power transmission system according to yet another embodiment of the present disclosure.
Figure 6:
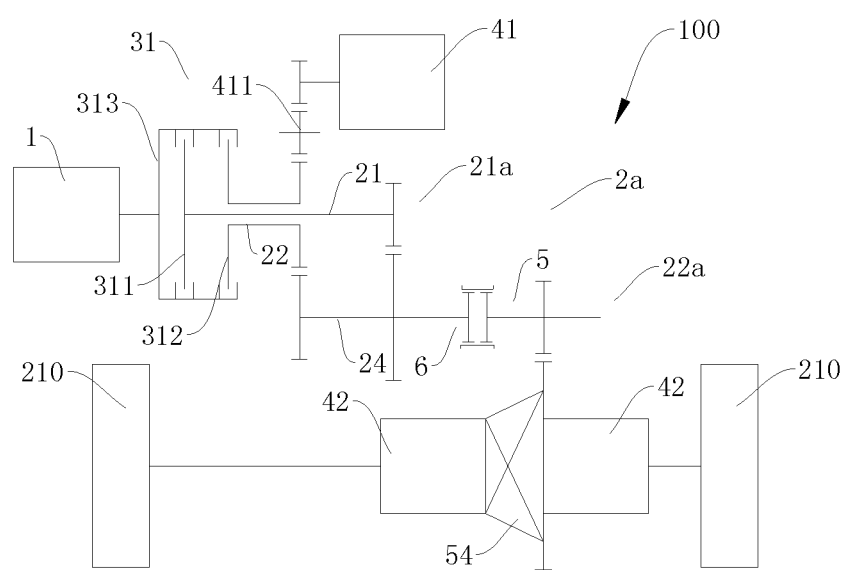
FIG. 6 is a schematic view of a power transmission system according to yet another embodiment of the present disclosure.
Figure 6:
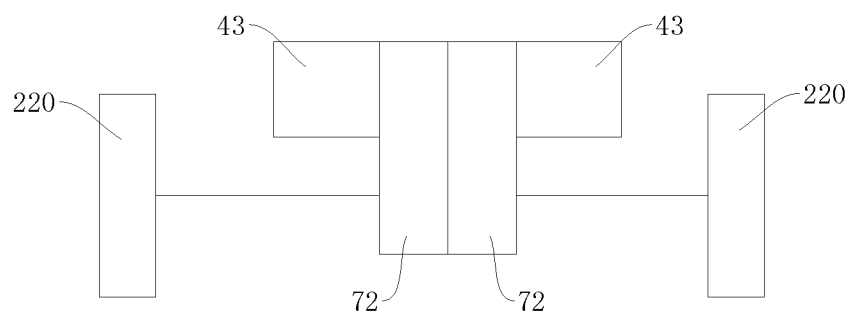
Figure 7:
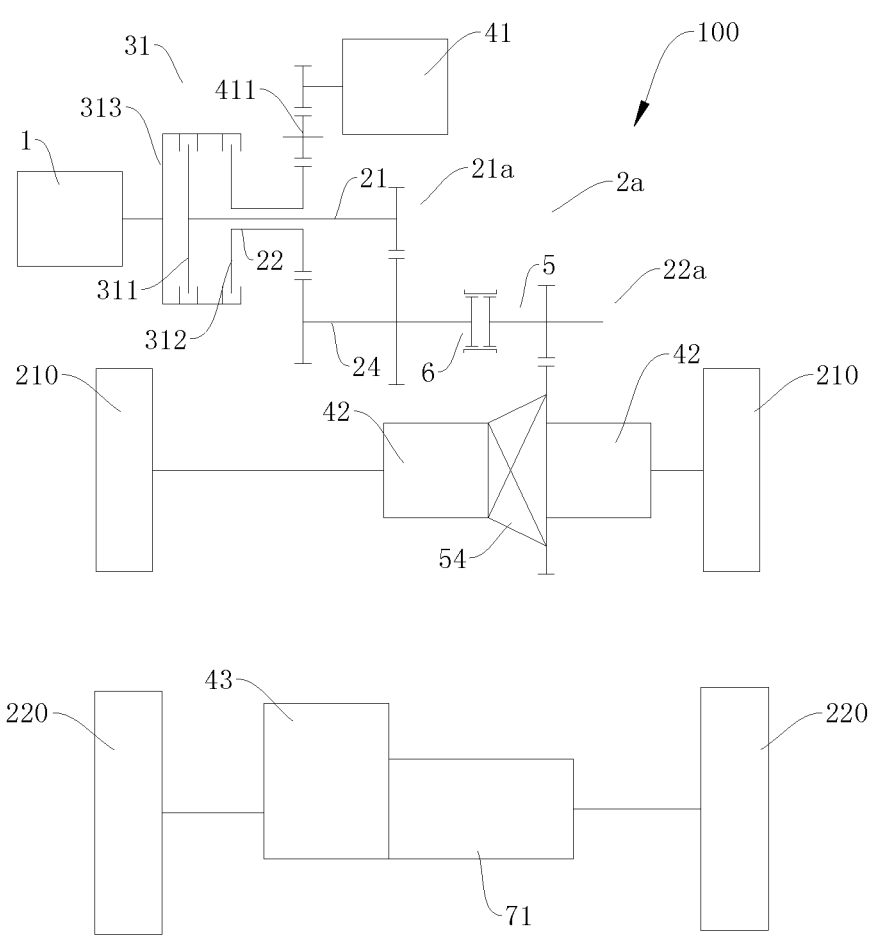
FIG. 7 is a schematic view of a power transmission system according to yet another embodiment of the present disclosure.
Figure 8:
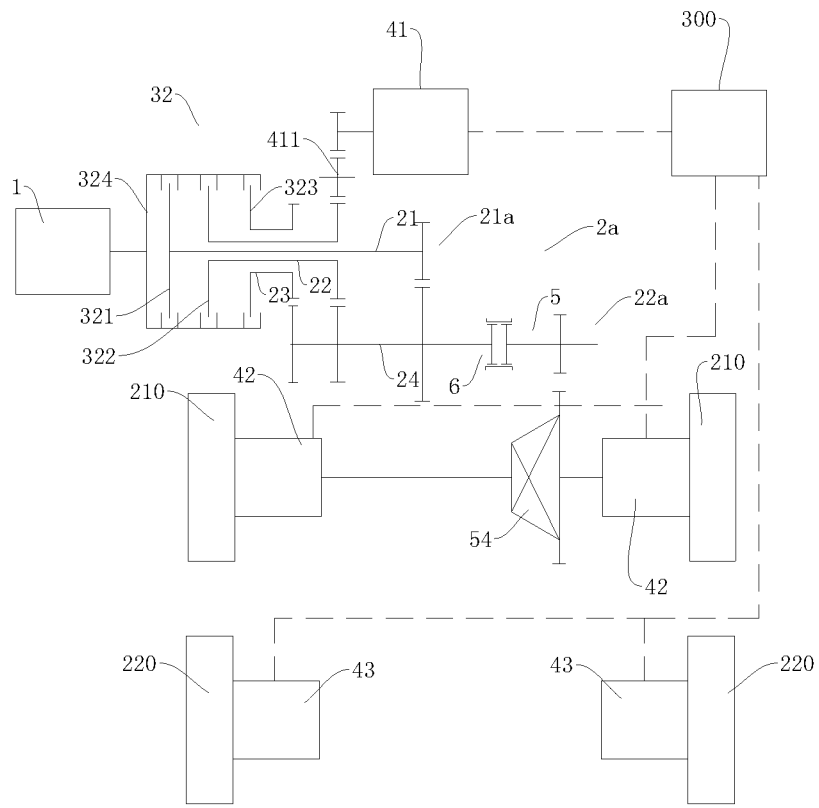
FIG. 8 is a schematic view of a power transmission system according to yet another embodiment of the present disclosure.
Figure 10:
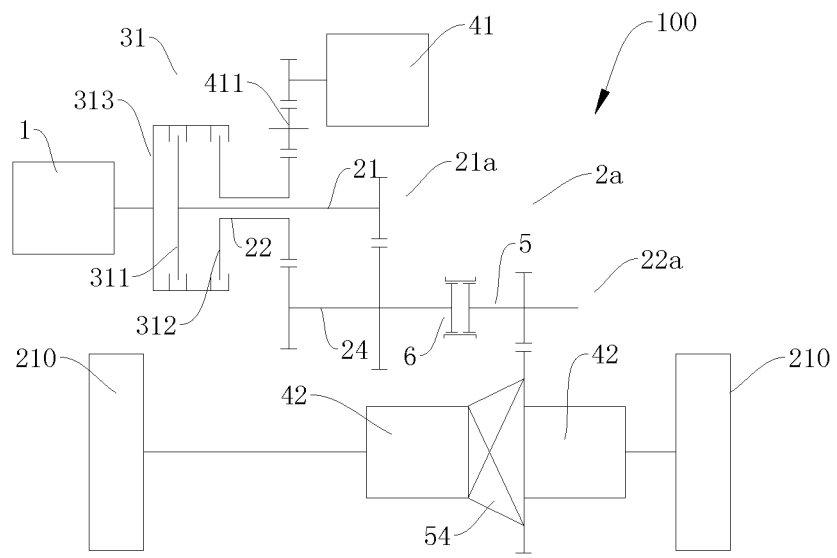
FIG. 10 is a schematic view of a power transmission system according to yet another embodiment of the present disclosure.

In some embodiments of the present disclosure, as shown in FIGS. 5-7 and 10, a pair of second motor generators 42 is disposed on two sides of the differential 54 back to back. For example, a pair of second motor generators 42 is disposed on two sides of the differential 54 and integrally formed with the differential 54. For example, the left second motor generator 42 can be disposed between a left half shaft and the left side of the differential 54, and the right second motor generator 42 can be disposed between a right half shaft and the right side of the differential 54. The power transmission system 100 in FIGS. 5-7 is operable in a four-wheel drive mode, and the power transmission system 100 in FIG. 10 is operable in a two-wheel drive mode. It should be noted that in the following, when referring to "motor generators are disposed on two sides of the differential 54 back to back," it means that the motor generators are disposed on two sides of the differential 54 respectively and integrally formed with the differential 54.

Figure 9:
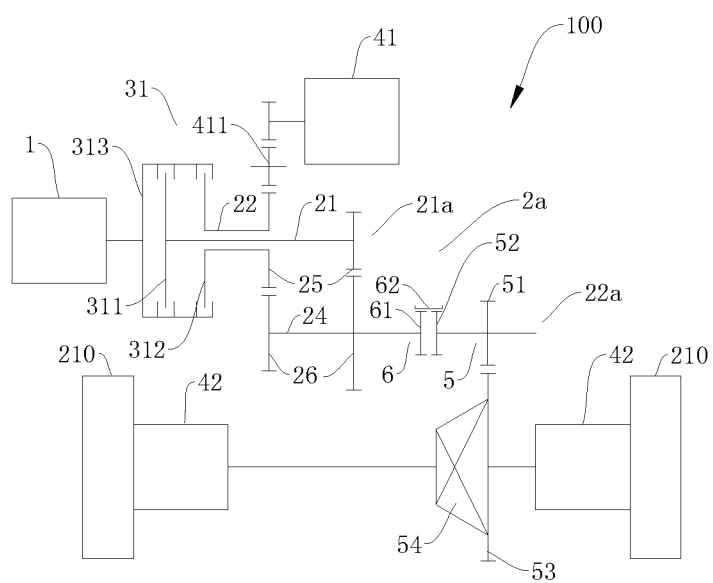
FIG. 9 is a schematic view of a power transmission system according to yet another embodiment of the present disclosure.

In some other embodiments of the present disclosure, as shown in FIGS. 2-4 and 9, the second motor generator 42 is a wheel-side motor. In other words, one of the second motor generators 42 is disposed at an inner side of the left front wheel, and the other of the second motor generators 42 is disposed at an inner side of the right front wheel, and the second motor generator 42 may transfer the power to a hub of a corresponding wheel via a gear mechanism. The power transmission system 100 in FIGS. 2-4 is operable in a four-wheel drive mode, and the power transmission system 100 in FIG. 9 is operable in a two-wheel drive mode.

In some embodiments of the present disclosure, two third motor generators 43 are provided, and the third motor generators 43 are a wheel-side motor, as shown in FIGS. 2 and 5. In other words, in the examples shown in FIGS. 2 and 5, one of the third motor generators 43 is disposed at an inner side of the left rear wheel, the other of the third motor generators 43 is disposed at an inner side of the right rear wheel, and the third motor generator 43 may transfer the power to a corresponding rear wheel via a gear mechanism.

In some other embodiments of the present disclosure, one third motor generator 43 is provided, and the third motor generator 43 drives the second pair of wheels via a first speed changing mechanism 71. The first speed changing mechanism 71 is preferably a reducing mechanism, and the reducing mechanism may be a one-stage or multi-stage reducing mechanism. The reducing mechanism may include, but is not limited to, a gear reducing mechanism, or a worm and worm gear reducing mechanism.

In these embodiments, the second pair of wheels may be connected with each other via an axle which may have an integral structure. The third motor generator 43 may directly drive the integral axle via the first speed changing mechanism 71, to drive the two wheels to rotate synchronously.

In some more embodiments of the present disclosure, two third motor generators 43 are provided, and each third motor generator 43 drives one of the second pair of wheels via a second speed changing mechanism 72. The second speed changing mechanism 72 is preferably a reducing mechanism, and the reducing mechanism may be a one-stage or multi-stage reducing mechanism. The reducing mechanism may include, but is not limited to, a gear reducing mechanism, or a worm and worm gear reducing mechanism.

In these embodiments, the two wheels in the second pair may be connected with the corresponding third motor generators 43 and the corresponding second speed changing mechanisms 72 via two half axles respectively. In other words, one of the third motor generators 43 may drive a corresponding half axle via one of the second speed changing mechanisms 72, so as to drive the wheel at an outer side of the half axle to rotate.

Figure 11:
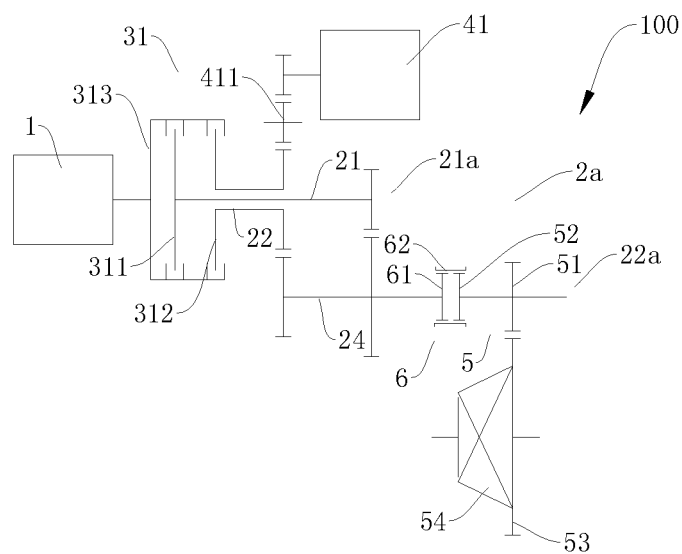
FIG. 11 is a schematic view of a power transmission system according to yet another embodiment of the present disclosure.
Figure 11:
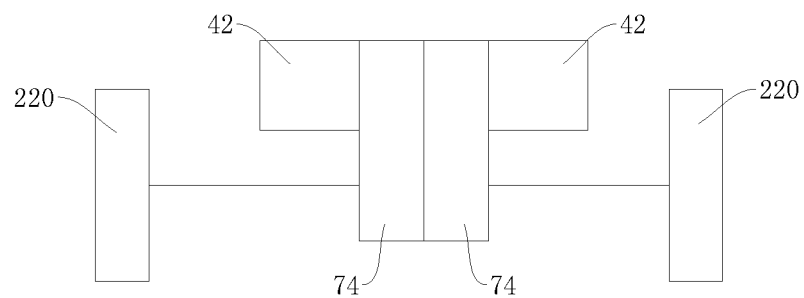
Figure 12:
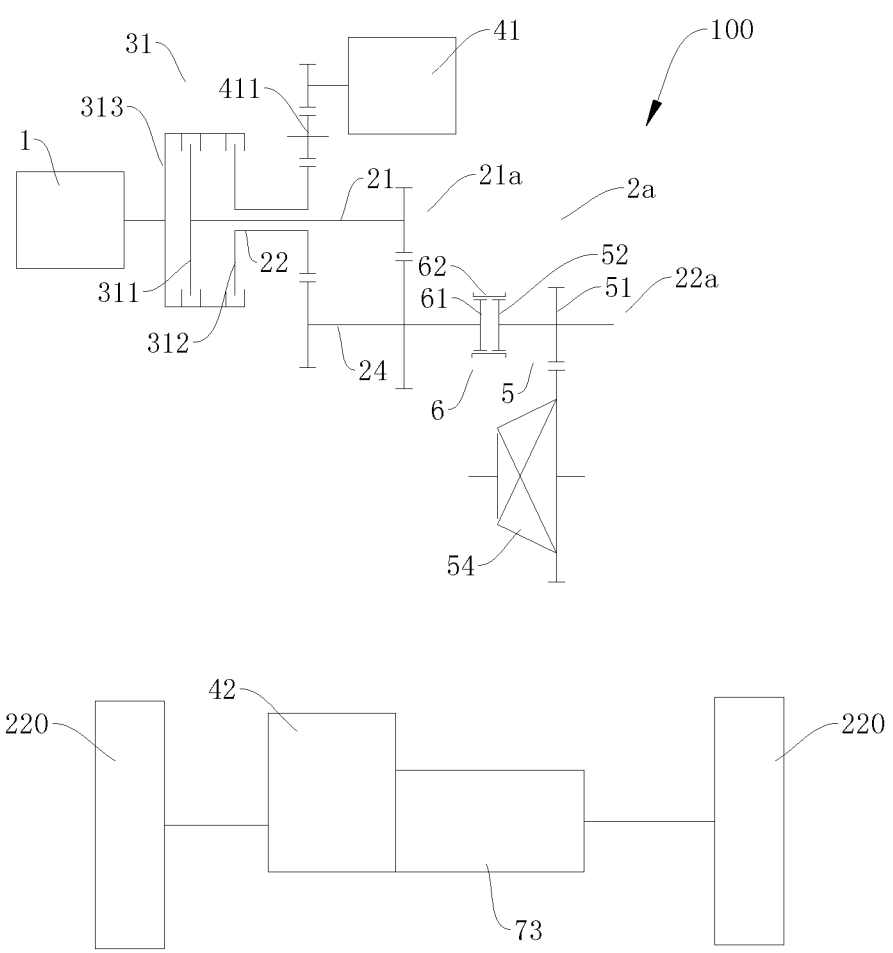
FIG. 12 is a schematic view of a power transmission system according to yet another embodiment of the present disclosure.
Figure 13:
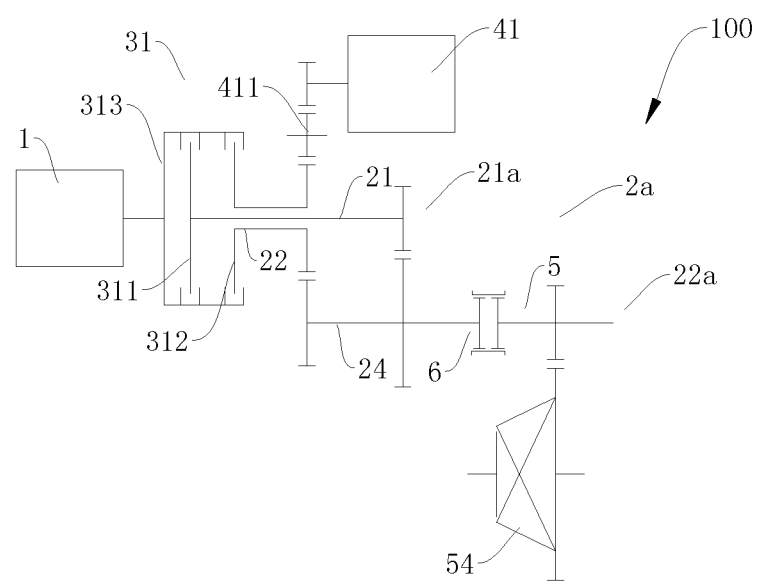
FIG. 13 is a schematic view of a power transmission system according to yet another embodiment of the present disclosure.
Figure 13:

In some other embodiments of the present disclosure, as shown in FIGS. 9-10, the power transmission system 100 is operable in a two-wheel drive mode. In an example shown in FIG. 9, the output unit 5 drives the front wheels 210, and the second motor generator 42 is a wheel-side motor and is configured to drive the front wheels 210. In an example shown in FIG. 10, the output unit 5 drives the front wheels 210, and the second motor generators 42 are disposed at two sides of the differential 54 back to back, for example, the second motor generators 42 are disposed at two sides of the differential 54 respectively and integrally formed with the differential 54. As shown in FIGS. 11-13, the power transmission system 100 is operable in a four-wheel drive mode. In an example shown in FIG. 11, the output unit 5 drives the front wheels 210, two second motor generators 42 are provided, and each second motor generator 42 drives one rear wheel 220 via one fourth speed changing mechanism 74. In an example shown in FIG. 12, the output unit 5 drives the front wheels 210, one second motor generator 42 is provided, and the second motor generator 42 drives the rear wheels 220 via one third speed changing mechanism 73. In an example shown in FIG. 13, the output unit 5 drives the front wheels 210, two second motor generators 42 are provided and are wheel-side motors, which are configured to drive the rear wheels 220.

The third speed changing mechanism 73 may be the same as the first speed changing mechanism 71. Similarly, the fourth speed changing mechanism 74 may be the same as the second speed changing mechanism 72. Therefore, the third speed changing mechanism 73 and the fourth speed changing mechanism 74 will not be described in detail here.

In some embodiments of the present disclosure, the power transmission system 100 may also include a battery component 300. The battery component 300 is preferably connected with the first motor generator 41, the second motor generator 42 and the third motor generator 43 respectively. Therefore, the first motor generator 41 is driven by the engine unit 1 to generate electricity or electric energy recovered by the first motor generator 41 during the braking may be supplied to and stored in the battery component 300, and electric energy recovered by the second motor generator 42 and the third motor generator 43 during the braking may also be supplied to and stored in the battery component 300. When the vehicle is operated in an EV mode, the battery component 300 may supply electric energy to at least one of the first motor generator 41, the second motor generator 42 and the third motor generator 43. It would be appreciated that the dot lines shown in FIG. 8 indicate that the battery component 300 may be electrically connected with the first motor generator 41, the second motor generator 42 and the third motor generator 43 respectively.

As an alternative embodiment of the power transmission system 100 described in the foregoing embodiment, as shown in FIG. 8, the power transmission system 100 includes input shafts, which include three shafts, e.g. the first input shaft 21, the second input shaft 22 and the third input shaft 23, with the second input shaft 22 being fitted over the first input shaft 21, and the third input shaft 23 being fitted over the second input shaft 22.

In the alternative embodiment, the power transmission system 100 further includes a triple clutch 32. The triple clutch 32 has an input terminal 324, a first output terminal 321, a second output terminal 322 and a third output terminal 323. The engine unit 1 is coupled with the input terminal 324 of the triple clutch 32, the first output terminal 321 of the triple clutch 32 is coupled with the first input shaft 21, the second output terminal 322 of the triple clutch 32 is coupled with the second input shaft 22, and the third output terminal 323 of the triple clutch 32 is coupled with the third input shaft 23.

Similarly, the input terminal 324 of the triple clutch 32 may be a shell thereof, and the first, second and third output terminals 321, 322, 323 of the triple clutch 32 may be three driven discs. The input terminal 324 may be engaged with one of the first, second and third output terminals 321, 322, and 323, or may be disconnected with the first, second and third output terminals 321, 322, and 323. It would be appreciated that the operation principle of the triple clutch 32 is similar to that of the dual clutch 31, so the detailed description thereof will be omitted here.

It should be noted that in the alternative embodiment, other parts such as the power transmitting manner between the first motor generator 41 and the first input shaft 21 or the output shaft 24 as well as the position and drive mode of the second motor generator 42 and the third motor generator 43, are also similar to those described in the technical solutions of the dual clutch 31, so the detailed description thereof will be omitted here.

Figure 14:
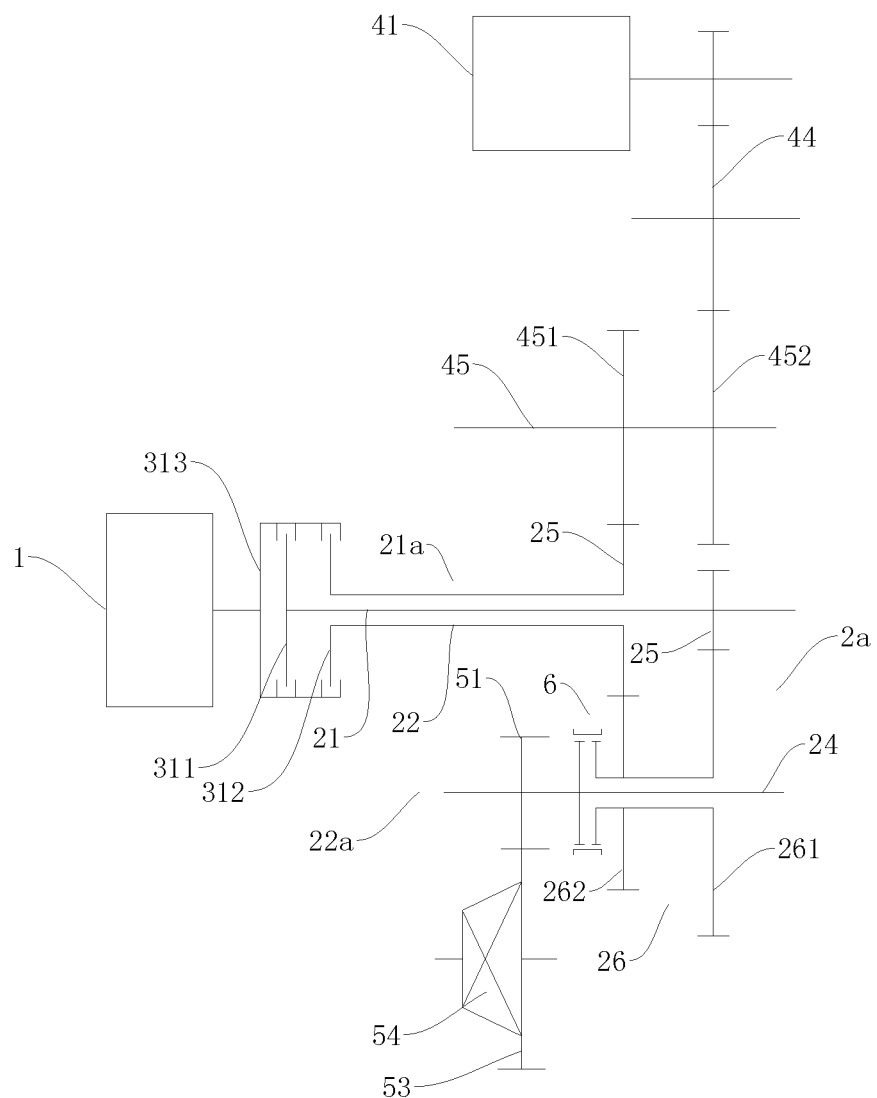
FIG. 14 is a schematic view of a power transmission system according to yet another embodiment of the present disclosure.
Figure 15:
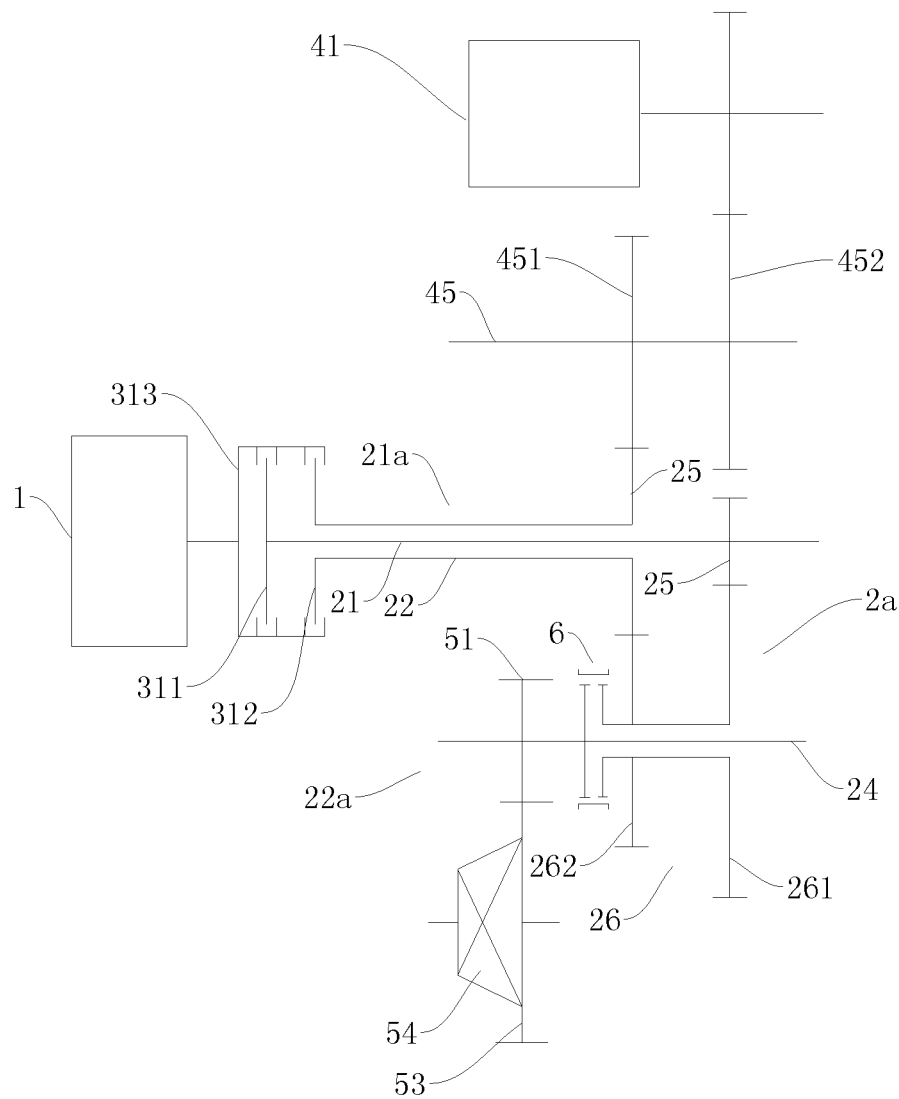
FIG. 15 is a schematic view of a power transmission system according to yet another embodiment of the present disclosure.
Figure 16:
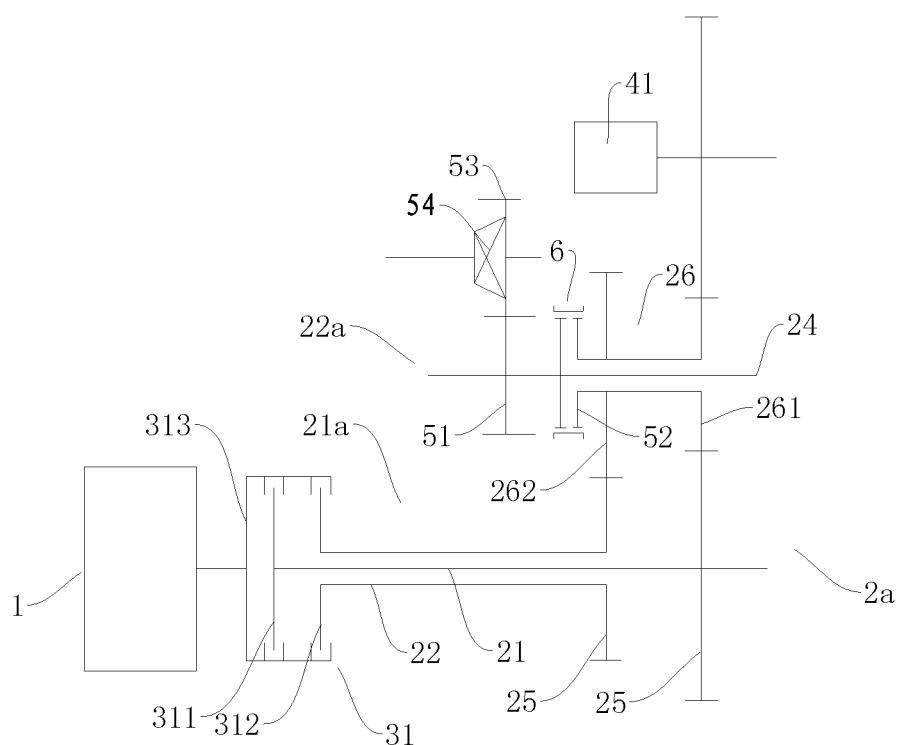
FIG. 16 is a schematic view of a power transmission system according to yet another embodiment of the present disclosure.

As another alternative embodiment of the power transmission system 100 described in the foregoing embodiment, as shown in FIGS. 14-16, the power transmission system 100 includes a driven gear 26 which is configured as a linked gear, and the linked gear structure 26 is freely fitted over the output shaft 24 and rotates differentially relative to the output shaft 24. The synchronizer 6 is disposed on the output shaft 24 and may be selectively engaged with the linked gear structure 26.

In the embodiment, specifically, two input shafts are provided, e.g. the first input shaft 21 and the second input shaft 22, and each input shaft is provided with one driving gear 25. The linked gear structure 26 can be a double-linked gear. The double-linked gear structure 26 has a first gear part 261 and a second gear part 262, and the first gear part 261 and the second gear part 262 are configured to mesh with two driving gears 25 respectively.

When the power transmission system 100 in this embodiment transmits the power, the synchronizer 6 may be engaged with the double-linked gear structure 26, such that the power output by at least one of the engine unit 1 and the first motor generator 41 may be output via the output unit 5 and, e.g., the driving gear 51 of the final drive.

In these embodiments, the power transmitting between the first motor generator 41 and the output shaft or one of the output shafts may be direct or indirect, and is similar to that described in the above embodiments, so the detailed description thereof will be omitted here. The arrangement of other components such as the clutch (e.g., the dual clutch 31 or the triple clutch 32) between the engine unit 1 and the input shaft is similar to that described in the above embodiments, so the detailed description thereof will also be omitted here.

In these embodiments, as shown in FIGS. 14-16, specifically, the power transmission system 100 may include an engine unit 1, a plurality of input shafts, an output shaft 24, an output unit 5 (e.g., the driving gear 51 of the final drive), a synchronizer 6 and a first motor generator 41.

A main difference of these alternative embodiments from the power transmission system 100 shown in FIGS. 2-13 is that a driven gear 26 which is a linked gear and can be freely fitted over the output shaft 24. With the output unit 5 fixed on the output shaft 24, the synchronizer 6 can be configured to engage with the linked gear. In these embodiments, the arrangement of the first motor generator 41 may slightly differ from that of the first motor generator 41 in the power transmission system 100 shown in FIGS. 2-13.

In some embodiments, as shown in FIGS. 14-16, a plurality of input shafts is provided, the input shafts are provided with the driving gears 25 thereon. The linked gear structure 26 is freely fitted over the output shaft 24. The linked gear structure 26 has a plurality of gear parts (for example, the first gear part 261, and the second gear part 262), and the gear parts are configured to mesh with the driving gears 25 on the input shafts respectively.

As shown in FIGS. 14-16, the output unit 5 is configured to output the power from the output shaft 24. For example, preferably, the output unit 5 is fixed on the output shaft 24. In an embodiment of the present disclosure, by way of example and without limitation, the output unit 5 may include the driving gear 51 of the final drive.

The synchronizer 6 is disposed on the output shaft 24. The synchronizer 6 is configured to selectively engage with the linked gear structure 26, so as to output the power via the output unit 5 to drive the wheels of the vehicle. The power transmission between the first motor generator 41 and one of the input shaft and the output shaft 24 may be direct or indirect.

In these embodiments, the function of the synchronizer 6 is substantially the same as that of the synchronizer 6 shown in FIGS. 2-13. The synchronizer 6 in these embodiments are configured to engage the linked gear structure 26 with the output shaft 24, while the synchronizer 6 shown in the embodiments in FIGS. 2-13 is configured to engage the output unit 5 with the output shaft 24.

In these embodiments, the function of the synchronizer 6 is to eventually synchronize the linked gear structure 26 with the output shaft 24, so that the linked gear structure 26 and the output shaft 24 can operate synchronously to output the power from at least one of the engine unit 1 and the first motor generator 41 with the output unit 5 as a power output terminal. When the linked gear structure 26 and the output shaft 24 are not synchronized by the synchronizer 6, the power from at least one of the engine unit 1 and the first motor generator 41 may not be directly output to the wheels 200 via the output unit 5.

The synchronizer 6 functions to switch the power. That is, when the synchronizer 6 is in an engaged state, the power from at least one of the engine unit 1 and the first motor generator 41 may be output via the output unit 5 to drive the wheels 200; and when the synchronizer 6 is in a disengaged state, the power from at least one of the engine unit 1 and the first motor generator 41 may not be transmitted to the wheels 200 via the output unit 5. In this way, by controlling the synchronizer 6 to switch between the engaged state and the disengaged state, the switching of the drive mode of the vehicle may be realized.

Moreover, the first motor generator 41 may adjust the speed of the linked gear structure 26 with the rotating speed of the output shaft 24 as a target value, so as to match the speed of the linked gear structure 26 with the speed of the output shaft 24 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle.

In addition, by using the linked gear structure 26, the power transmission system 100 is more compact in structure and easy to arrange, and the number of the driven gears may be decreased so as to reduce the axial dimension of the power transmission system 100, thus reducing the cost and the arrangement difficulty.

Furthermore, the synchronizer 6 may be controlled by one separate fork, such that the control steps are simple and the reliability is high.

In some embodiments of the present disclosure, the input shafts are coaxially nested, and each input shaft is provided with one driving gear 25. In an embodiment, the input shafts include a first input shaft 21 and a second input shaft 22, and each input shaft is provided with one driving gear 25. The linked gear structure 26 is a double-linked gear, the double-linked gear structure 26 has a first gear part 261 and a second gear part 262, and the first gear part 261 and the second gear part 262 are configured to mesh with two driving gears 25 respectively.

A dual clutch 31 may be disposed between the engine unit 1 and the first and second input shafts 21 and 22. For this part, reference may be made to the dual clutch 31 in the power transmission system 100 shown in FIGS. 2 to 13. Optionally, the dual clutch 31 may be provided with a damping structure thereon. For example, the damping structure may be arranged between a first output terminal and an input terminal of the dual clutch 31, to adapt to start the vehicle at a low gear.

As shown in FIGS. 14-16, direct power transmitting and indirect power transmitting between an output terminal of the first motor generator 41 and one driving gear can be performed.

For example, the power transmission system 100 in these embodiments further includes an intermediate shaft 45. A first intermediate shaft gear 451 and a second intermediate shaft gear 452 are fixed on the intermediate shaft 45. One of the first and second intermediate shaft gears 451 and 452 is configured to mesh with one driving gear 25. For example, as shown in FIGS. 14-15, the first intermediate shaft gear 451 is configured to mesh with the driving gear 25 on the second input shaft 22. Of course, the present disclosure is not limited to these examples.

In some embodiments of the present disclosure, direct power transmission between the output terminal of the first motor generator 41 and one of the first and second intermediate shaft gears 451 and 452, or indirect power transmission between the output terminal of the first motor generator 41 and one of the first and second intermediate shaft gears 451 and 452 via an intermediate idler 44, can be performed. For example, as shown in FIG. 14, indirect power transmitting between the output terminal of the first motor generator 41 and the second intermediate shaft gear 452 via an intermediate idler 44 is performed. As another example, as shown in FIG. 15, the output terminal of the first motor generator 41 is configured to directly mesh with the second intermediate shaft gear 452 for power transmission.

As shown in FIG. 16, the output terminal of the first motor generator 41 is configured to directly mesh with one gear part of the linked gear structure 26. For example, the output terminal of the first motor generator 41 can be configured to directly mesh with the first gear part 261 for power transmission.

However, it would be appreciated that, the present disclosure is not limited to this. The position of the first motor generator 41 may be designed according to practical requirements. For example, the position of the first motor generator 41 may be the same as that described above, or may be as shown in FIGS. 2-13, which will not be described in detail here.

As shown in FIGS. 14-15, the first gear part 261 inputs a torque to the engine unit 1 separately, and the second gear part 262 may input a torque to the engine unit 1 and the first motor generator 41 simultaneously.

As shown in FIGS. 14-16, an engagement gear ring 52 is fixed on a side of the linked gear structure 26 facing the synchronizer 6, and the synchronizer 6 is adapted to engage with the engagement gear ring 52, such that the linked gear structure 26 is rigidly fixed with the output shaft 24 to rotate synchronously with the output shaft 24.

Figure 17:
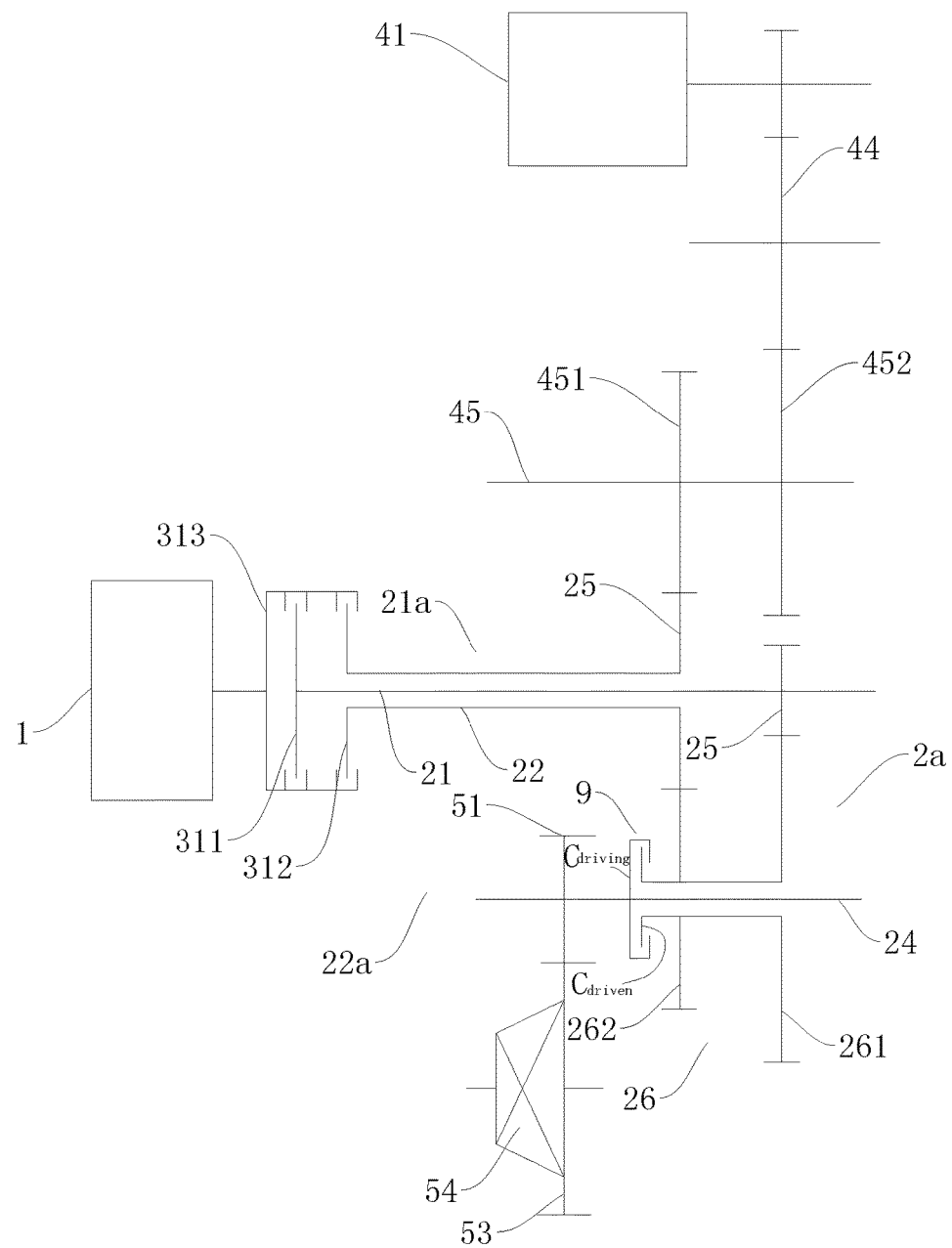
FIG. 17 is a schematic view of a power transmission system according to yet another embodiment of the present disclosure.
Figure 18:
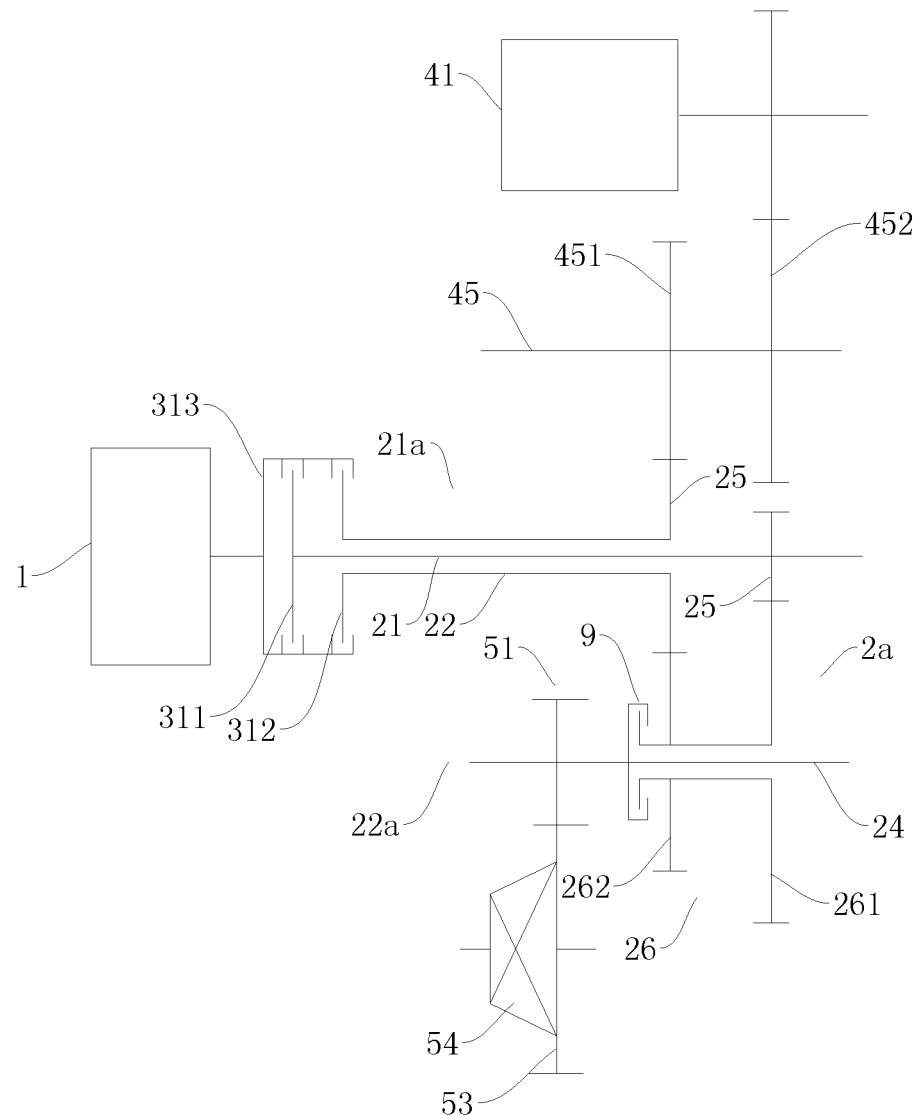
FIG. 18 is a schematic view of a power transmission system according to yet another embodiment of the present disclosure.
Figure 19:
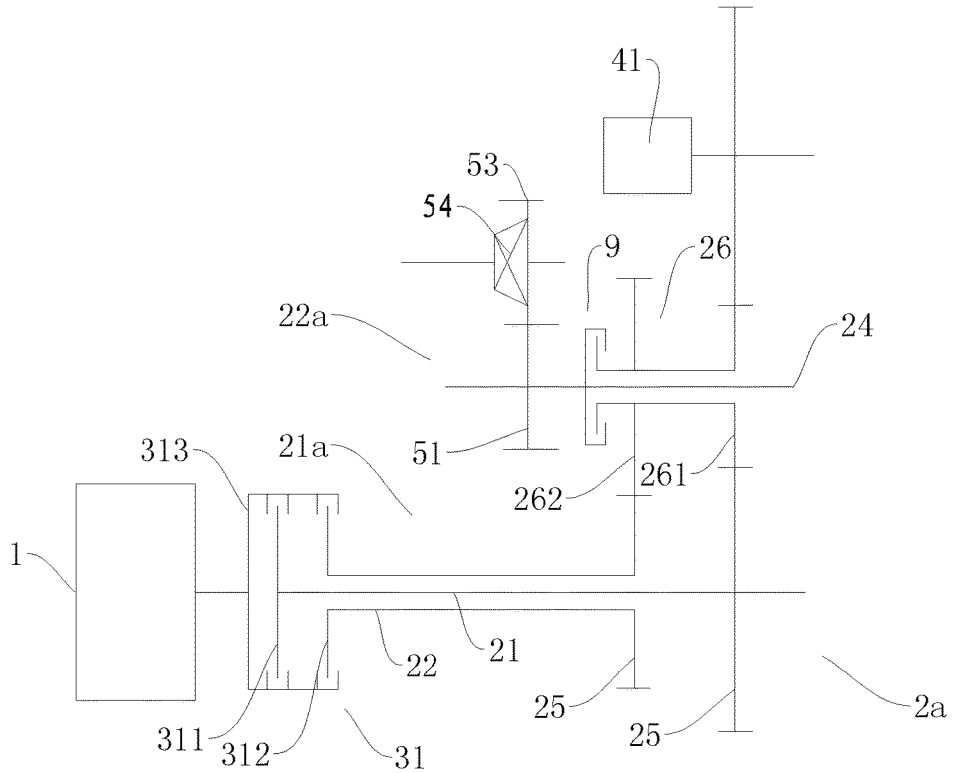
FIG. 19 is a schematic view of a power transmission system according to yet another embodiment of the present disclosure.

In another embodiment of the power transmission system 100 described in the foregoing linked gear embodiment, as shown in FIGS. 17-19, in the power transmission system 100, the synchronizer 6 in the above embodiments can be replaced with a clutch 9.

In these embodiments, as shown in FIGS. 17-19, the power switching device is a clutch 9. The clutch 9 is adapted to enable or interrupt a power transmission between the transmission unit 2a and the output unit 5. In other words, by the engagement of the clutch 9, the transmission unit 2a and the output unit 5 may operate synchronously, and the output unit 5 may output the power from the transmission unit 2a to the wheels 200. When the clutch 9 is in a disengaged state, the power output by the transmission unit 2a may not be directly output via the output unit 5.

In these embodiments, the double-linked gear structure 26 is freely fitted over the output shaft 24, and the output unit 5 is fixed on the output shaft 24. The clutch 9 has a driving part ($C_{driving}$ in FIG. 17) and a driven part ($C_{driven}$ in FIG. 17). One of the driving part and the driven part of the clutch 9 is disposed on a linked gear structure such as a double-linked gear 26, and the other of the driving part and the driven part of the clutch 9 is disposed on the output shaft 24. The driving part and the driven part of the clutch 9 may be disengaged from or engaged with each other. For example, as shown in FIG. 17, the driving part may be disposed on the output shaft 24, and the driven part may be disposed on the linked gear structure 26, but the present disclosure is not limited to this.

Therefore, after the driving part and the driven part of the clutch 9 are engaged with each other, the output shaft 24 is engaged with the double-linked gear structure 26 freely fitted over the output shaft 24, so as to output the power via the output unit 5. After the driving part and the driven part of the clutch 9 are disengaged from each other, the linked gear structure 26 is freely fitted over the output shaft 24, and the output unit 5 does not transfer the power from the transmission unit 2a.

Generally speaking, for the power transmission system 100 according to embodiments of the present disclosure, since the synchronizer 6 is used for power switching and has advantages of small volume, simple structure, large torque transmission and high transmission efficiency, the power transmission system 100 according to embodiments of the present disclosure has a reduced volume, a more compact structure and high transmission efficiency, and may meet the large-torque transmission requirements.

Meanwhile, by the speed compensation of at least one of the first motor generator 41, the second motor generator 42 and the third motor generator 43, no torque engagement of the synchronizer 6 may be realized, the ride comfort is better, the engagement speed is higher, and the dynamic response is faster. Compared to a clutch transmission in the related art, larger torque may be withstood without failure, thus greatly improving the stability and reliability of the transmission.

In some embodiments of the present disclosure, as shown in FIGS. 2-3, 5, 6 and 8, to achieve torque distribution of the wheels, in the five embodiments, four motor generators are used, and each motor generator is configured to drive one wheel. An advantage of four independent motors driving the vehicle lies in that: In the related art, a mechanical four-wheel drive vehicle may only achieve the torque distribution of front and rear wheels, and a full-time four-wheel drive vehicle may only achieve small difference in instantaneous torque of left and right wheels. However, in the foregoing five embodiments, since four motors are used for driving the vehicle, +100% to −100% torque difference adjustment of the left and right wheel motors may be realized, thus greatly enhancing the steering stability during the high-speed turning, and solving the problems of understeer and oversteer. Furthermore, the turning radius of the vehicle may be greatly reduced by the rotation of the left and right wheels in opposite directions when the vehicle runs at a low speed, such that the vehicle is easy to operate.

The structure of the power transmission system 100 in various specific embodiments will be described below with reference to FIGS. 2-19.

Embodiment 1

As shown in FIG. 2, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is fixedly provided with one driving gear 25, and indirect power transmission between the first motor generator 41 and the driving gear 25 on the second input shaft 22 is performed via one intermediate gear 411. The output shaft 24 is fixedly provided with two driven gears 26, and the two driven gears 26 are configured to mesh with the driving gears 25 on the first input shaft 21 and the second input shaft 22, to form two gears.

The synchronizer 6 is disposed on the output shaft 24, the driving gear (e.g. the output gear 51) of the final drive may rotate differentially relative to the output shaft 24, while the engagement gear ring 52 adapted to the synchronizer 6 is fixed on a left side of the driving gear of the final drive by using a connecting rod. The driving gear of the final drive is configured to externally mesh with the driven gear 53 of the final drive, and the driven gear 53 of the final drive may be fixed on the differential 54, to transfer the power to the differential 54. The differential 54 distributes the power and adaptively transfers the distributed power to half axles on two sides of the vehicle, to drive the wheels 200.

Two second motor generators 42 constitute wheel-side motors configured to drive two front wheels 210 respectively, and two third motor generators 43 constitute wheel-side motors configured to drive two rear wheels 220 respectively. That is, in the solution, each of the four wheels is provided with one wheel-side motor.

With the power transmission system 100 in this embodiment, by the engagement or disengagement of the dual clutch 31, the power from the engine unit 1 may be transferred to the output shaft 24 with two different transmission ratios respectively. The first motor generator 41 may transfer the power to the output shaft 24 with a constant transmission ratio via a shift gear set. When the synchronizer 6 is in an engaged state, the power from the output shaft 24 may be transferred to the front wheels 210 via the final drive and the differential 54. When the synchronizer 6 is in a disengaged state, the power from the output shaft 24 may not be transferred to the front wheels 210. The two second motor generators 42 are wheel-side motors, and may directly drive two front wheels 210 respectively. The two third motor generators 43 are wheel-side motors, and may directly drive two rear wheels 220 respectively.

The power transmission system 100 in this embodiment may have at least the following operating conditions: a pure electric vehicle (EV) operating condition of the third motor generator 43, a pure EV four-wheel drive operating condition, a parallel operating condition, a series operating condition, and a braking/decelerating feedback operating condition.

First Operating Condition

This operating condition is a pure EV operating condition of the third motor generator 43. The dual clutch 31 is in a disengaged state, the synchronizer 6 is in a disengaged state, the engine unit 1, the first motor generator 41 and the second motor generator 42 do not operate, and two third motor generators 43 drive two rear wheels 220 respectively. This operating condition is mainly applicable to a situation where a load is small and an electric quantity of a battery is large, for example, during uniform motions or under urban operating conditions.

This operating condition has the advantages that since the third motor generators 43 directly drive the rear wheels 220, compared to a front-wheel drive vehicle, the vehicle in this embodiment has better acceleration performance, gradeability and steering capability. Moreover, since the third motor generators 43 independently drive the left rear wheel and the right rear wheel respectively, an electronic differential function may be achieved, thus increasing the operating stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in a disengaged state, the first motor generator 41 does not operate, two second motor generators 42 are configured to drive two front wheels 210 respectively, and two third motor generators 43 are configured to drive two rear wheels 220 respectively. This operating condition is mainly applicable to a situation where a load is large and an electric quantity of a battery is large, for example, during acceleration, climbing, overtaking, or high-speed running.

This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Moreover, compared to a front-wheel drive vehicle and a rear-wheel drive vehicle, a pure EV four-wheel drive vehicle has better acceleration performance, gradeability, handling performance and off-road capability. Since two second motor generators 42 and two third motor generators 43 drive four wheels independently, the wheels may obtain different torques and rotating speeds, to achieve the individual control on the four wheels, thus maximizing the dynamic performance, operating stability and off-road performance. Furthermore, when torques in different directions are applied to the left and right wheels by corresponding motor generators, the in-situ steering of the vehicle may be realized.

Third Operating Condition

This operating condition is a parallel operating condition. The dual clutch 31 is in an engaged state, the synchronizer 6 is in an engaged state, and the engine unit 1 and the first motor generator 41 transfer the power to the driving gear 51 of the final drive via the shift gear set and the synchronizer 6, and the driving gear 51 of the final drive transfers the power to the front wheels 210 via the differential 54, while two second motor generators 42 transfer the power to the corresponding front wheels 210 and two third motor generators 43 transfer the power to the corresponding rear wheels 220. This operating condition is mainly applicable to a situation where a load is the largest, for example, during quick acceleration, or climbing steep slopes.

This operating condition has the advantages that the five motor generators and the engine unit 1 drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability. Moreover, since the third motor generators 43 independently drive the left rear wheel and the right rear wheel respectively, an electronic differential function may be achieved, and a mechanical differential in the related art is avoided, thus reducing parts while increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 are configured to drive the front wheels 210 respectively, and the third motor generators 43 are configured to drive the rear wheels 220 respectively. This operating condition is mainly applicable to a situation where a load is medium and an electric quantity of a battery is small.

This operating condition has the advantages that, when compared to a front-wheel drive vehicle and a rear-wheel drive vehicle, the vehicle under the series (e.g. four-wheel drive series) operating condition has better acceleration performance, gradeability, handling performance and off-road capability. Since two second motor generators 42 and two third motor generators 43 drive four wheels independently, the wheels may obtain different torques and rotating speeds, so as to achieve the individual control on the four wheels, thus maximizing the dynamic performance, handling stability and off-road performance. Furthermore, when torques in different directions are applied to the left and right wheels by corresponding motor generators, the in-situ steering of the vehicle may be realized. Moreover, the first motor generator 41 may keep the engine unit 1 running in an optimal economic region through torque and rotating speed adjustment, thus reducing fuel consumption during the electricity generation.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generators 42 brake the front wheels 210 and generate electricity, and the third motor generators 43 brake the rear wheels 220 and generate electricity. This operating condition is mainly used for braking or decelerating the vehicle.

This operating condition has the advantages that, since the second motor generator 42 and the third motor generator 43 brake four wheels respectively during the decelerating or braking, whether the vehicle is turning or moving straightly, the power of each wheel may be fully absorbed, in the premise of ensuring the braking force and stability of the vehicle, thus maximizing the energy feedback. Moreover, because of the disengagement of the synchronizer 6, while the four motor generators brake the four wheels respectively, the engine unit 1 and the first motor generator 41 may continue generating electricity, so as to enable a stable electricity generation state, avoid frequent switching, and extend the life of components.

Sixth Operating Condition

This operating condition is a series-parallel operating condition. The dual clutch 31 is in an engaged state, the synchronizer 6 is in an engaged state, a part of the power from the engine unit 1 drives the first motor generator 41 via the dual clutch 31 and the shift gear set to generate electricity, the other part of the power from the engine unit 1 is transferred to the driving gear 51 of the final drive via the shift gear set and the synchronizer 6, the second motor generators 42 drive the front wheels 210 directly via the driving gear 51 of the final drive, and the third motor generators 43 drive the rear wheels 220 respectively. This operating condition is mainly applicable to a situation where a load is large and an electric quantity of a battery is small, for example, during acceleration or climbing. This operating condition has the advantages of exploiting all the power from the engine unit 1, ensuring the dynamic performance of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

The switching from the fourth operating condition to the third operating condition will be described as follows. For example, when it is necessary to quickly accelerate for overtaking or avoiding obstacles, according to the accelerator demand of a driver, the power transmission system 100 may switch from the fourth operating condition to the third operating condition. At this time, the first motor generator 41 may adjust the rotating speed of the output shaft 24 with the rotating speed of the driving gear of the final drive as a target value through the rotating speed control, so as to match the rotating speed of the output shaft 24 with the rotating speed of the driving gear of the final drive as far as possible, thus facilitating the engagement of the synchronizer 6.

During the matching, the second motor generators 42 and the third motor generators 43 may respond to the needs of the driver to increase the torque, such that the vehicle is accelerated, unlike a vehicle in the related art, the vehicle needs not to be accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the accelerator demand or the brake pedal operation of the driver, the power transmission system 100 may switch from the fourth operating condition to the fifth operating condition. The second motor generators 42 and the third motor generators 43 may meet the braking feedback requirements, and the feedback of the first motor generator 41 is not needed. At this time, the second motor generators 42 and the third motor generators 43 may instantly respond to the needs of the driver to brake the wheels and feedback the electric quantity, which need not be like a vehicle in the related art which feeds back the electric quantity only when the synchronizer 6 is in an engaged state.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Under complex road conditions, for example, when the vehicle runs uphill, downhill, on a bumpy road, or under a low adhesion condition, the engagement of the synchronizer 6 can be difficult due to the changing speed of the vehicle. Even if the first motor generator 41 may adjust the rotating speed of the output shaft 24 through the rotating speed control, since the rotating speed of the driving gear of the final drive along with the speed of the vehicle may not be controllable, the speed adjusting accuracy and rate of the first motor generator 41 may be reduced. Under such road conditions, since the second motor generators 42 and the third motor generators 43 may compensate for the torque of the vehicle, the speed of the vehicle may be stabilized effectively, thus improving the driving experience of the vehicle and simplifying the engagement of the synchronizer 6.

Embodiment 2

As shown in FIG. 3, the power transmission system 100 in this embodiment differs from the power transmission system 100 shown in FIG. 2 in the arrangement of the third motor generators 43. In this embodiment, each third motor generator 43 drives a corresponding rear wheel 220 via one second speed changing mechanism 72. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, except that the power transfer between the third motor generators 43 and the corresponding rear wheels 220 is performed via the second speed changing mechanism 72, which will not be detailed here.

Embodiment 3

As shown in FIG. 4, the power transmission system 100 in this embodiment differs from the power transmission system 100 shown in FIG. 2 in the arrangement of the third motor generators 43. In this embodiment, one third motor generator 43 is provided and drives the rear wheels 220 via one first speed changing mechanism 71. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, except that since two rear wheels 220 are driven by one third motor generator 43 and one first speed changing mechanism 71, in the premise of no new components, the differential function of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Embodiment 4

As shown in FIG. 5, the power transmission system 100 in this embodiment differs from the power transmission system 100 shown in FIG. 2 in the arrangement of the second motor generators 42. In this embodiment, the second motor generators 42 are disposed at two sides of the differential 54 back to back respectively. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, which will not be detailed here.

Embodiment 5

As shown in FIG. 6, the power transmission system 100 in this embodiment differs from the power transmission system 100 shown in FIG. 5 in the arrangement of the third motor generators 43. In this embodiment, each third motor generator 43 drives a corresponding rear wheel 220 via one second speed changing mechanism 72. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, which will not be detailed here.

Embodiment 6

As shown in FIG. 7, the power transmission system 100 in this embodiment differs from the power transmission system 100 shown in FIG. 5 in the arrangement of the third motor generators 43. In this embodiment, one third motor generator 43 is provided and drives the rear wheels 220 via one first speed changing mechanism 71. Other parts in this embodiment are substantially the same as those in the power transmission system 100 in the embodiment shown in FIG. 5, so the detailed description thereof will be omitted here. The specific operating conditions of the power transmission system 100 in this embodiment are substantially the same as those of the power transmission system 100 in the embodiment shown in FIG. 5, except that since two rear wheels 220 are driven by one third motor generator 43 and one first speed changing mechanism 71, in the premise of no new components, the differential function of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Embodiment 7

As shown in FIG. 8, the power transmission system 100 in this embodiment differs from the power transmission system 100 shown in FIG. 2 in the type of the clutch as well as the number of the input shafts, the driving gears 25 and the driven gears 26. In this embodiment, the clutch is a triple clutch 32, three input shafts are provided, and correspondingly three pairs of driving gears 25 and driven gears 26 are provided. Other parts in this embodiment are substantially the same as those in the power transmission system 100 in the embodiment shown in FIG. 2, so the detailed description thereof will be omitted here.

Embodiment 8

As shown in FIG. 9, the power transmission system 100 in this embodiment differs from the power transmission system 100 shown in FIG. 2 in that the third motor generators 43 in the embodiment shown in FIG. 2 are eliminated, and the power transmission system 100 in this embodiment is operable in a two-wheel drive mode.

The power transmission system 100 in this embodiment may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and the second motor generators 42 drive the front wheels 210 directly. This operating condition is mainly applicable to a situation where a load is small and an electric quantity of a battery is large, for example, during uniform motions or under urban operating conditions.

This operating condition has the advantages that, since the second motor generators 42 directly drive the front wheels 210, the transmission chain is the shortest, and operating components are the fewest, thus achieving maximum transmission efficiency and minimum noise. Moreover, since the second motor generators 42 independently drive the left front wheel 210 and the right front wheel 210 respectively, an electronic differential function may be achieved, thus increasing the handling stability and reducing the amount of tire wear.

Second Operating Condition

This operating condition is a pure EV operating condition of three motors. The dual clutch 31 is in a disengaged state, the synchronizer 6 is in an engaged state, the engine unit 1 does not operate, the first motor generator 41 transfers the power to the driving gear 51 of the final drive via the shift gear set and the synchronizer 6, and the driving gear 51 of the final drive evenly distributes the power to the left and right front wheels 210 via the differential 54, while the second motor generators 42 directly drive the left and right front wheels 210.

This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Third Operating Condition

This operating condition is a parallel operating condition. The dual clutch 31 is in a disengaged state, the synchronizer 6 is in an engaged state, the engine unit 1 and the first motor generator 41 transfer the power to the driving gear 51 of the final drive via the shift gear set and the synchronizer 6, the driving gear 51 of the final drive evenly distributes the power to the left and right front wheels via the differential 54, and the second motor generators 42 directly drive the left and right front wheels. This operating condition is mainly applicable to a situation where a load is the largest, for example, during quick acceleration, or climbing steep slopes.

This operating condition has the advantages that three motors and the engine unit 1 drive the vehicle simultaneously, thus maximizing the dynamic performance.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 directly drive the wheels. This operating condition is mainly applicable to a situation where a load is medium and an electric quantity of a battery is small.

This operating condition has the advantages that, since the second motor generators 42 directly drive the wheels, the transmission chain is the shortest, and operating components are the fewest, thus achieving maximum transmission efficiency and minimum noise.

Meanwhile, the first motor generator 41 may keep the engine unit 1 running in an optimal economic region through torque and rotating speed adjustment, thus reducing fuel consumption during the electricity generation. Moreover, since the second motor generators 42 independently drive the left front wheel and the right front wheel respectively, an electronic differential function may be achieved, thus increasing the handling stability and reducing the amount of tire wear.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, and the second motor generator 42 directly brakes the wheels and generates electricity. This operating condition is mainly used for braking or decelerating the vehicle. This operating condition has the advantages that, since the second motor generator 42 brake two wheels respectively during the decelerating or braking of the vehicle, the braking energy may be absorbed to the largest extent and converted into electric energy, and the engine unit 1 and the first motor generator 41 may continue generating electricity, to enable a stable electricity generation state and avoid frequent switching.

The above five operating conditions may be switched, and typical switching between operating conditions is switching from the fourth operating condition to the third operating condition, or switching from the fourth operating condition to the fifth operating condition.

The switching from the fourth operating condition to the third operating condition will be described as follows. For example, when it is necessary to quickly accelerate for overtaking or avoiding obstacles, according to the accelerator demand of a driver, the power transmission system may switch from the fourth operating condition to the third operating condition. At this time, the first motor generator 41 may adjust the rotating speed of the output shaft 24 with the rotating speed of the driving gear 51 of the final drive as a target value through the rotating speed control, so as to match the rotating speed of the output shaft 24 with the rotating speed of the driving gear 51 of the final drive as far as possible, thus facilitating the engagement of the synchronizer 6. During the matching, the second motor generators 42 may respond to the needs of the driver to increase the torque, such that the vehicle is accelerated, unlike a vehicle in the related art, the vehicle does not require the synchronizer 6 to be in an engaged state in order to be accelerated. The torque compensation in advance may greatly shorten the torque response time and improve the instantaneous acceleration performance of the vehicle.

For example, the switching from the fourth operating condition to the fifth operating condition will be described as follows. When the vehicle needs to be braked or decelerated, according to the accelerator demand or the brake pedal operation of the driver, the power transmission system 100 may switch from the fourth operating condition to the fifth operating condition. The second motor generators 42 may meet the braking feedback requirements, and the feedback of the first motor generator 41 is not needed. At this time, the second motor generators 42 may instantly respond to the needs of the driver to brake the wheels and feedback the electric quantity, unlike a vehicle in the related art, the vehicle does not require the synchronizer 6 to be in an engaged state to feed back the electric quantity.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Under complex road conditions, for example, when the vehicle runs uphill, downhill, on a bumpy road, or under a low adhesion condition, the engagement of the synchronizer 6 is difficult due to the changing speed of the vehicle. Even if the first motor generator 41 may adjust the rotating speed of the output shaft 24 through the rotating speed control, since the rotating speed of the driving gear of the final drive along with the speed of the vehicle is not controllable, the speed adjusting accuracy and rate of the first motor generator 41 may be reduced. Under these road conditions, since the second motor generators 42 may compensate for the torque of the vehicle, the speed of the vehicle may be stabilized effectively, thus improving the driving experience of the vehicle and simplifying the engagement of the synchronizer 6.

Embodiment 9

As shown in FIG. 10, the power transmission system 100 in this embodiment differs from the power transmission system 100 shown in FIG. 9 in the arrangement of the second motor generators 42. In this embodiment, the second motor generators 42 are disposed at two sides of the differential 54 back to back respectively. Other parts in this embodiment are substantially the same as those in the power transmission system 100 in the embodiment shown in FIG. 9, so the detailed description thereof will be omitted here.

Embodiment 10

As shown in FIG. 11, the power transmission system 100 in this embodiment differs from the power transmission system 100 shown in FIG. 9 in the arrangement of the second motor generators 42. In this embodiment, two second motor generators 42 are provided, and each second motor generator 42 drives a corresponding rear wheel 220 via one fourth speed changing mechanism 74. Other parts in this embodiment are substantially the same as those in the power transmission system 100 in the embodiment shown in FIG. 9, so the detailed description thereof will be omitted here.

The power transmission system 100 in this embodiment may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and each second motor generator 42 drives one rear wheel via a corresponding fourth speed changing mechanism 74. This operating condition is mainly applicable to a situation where a load is small and an electric quantity of a battery is large, for example, during uniform motions or under urban operating conditions. This operating condition has the advantages that, since the second motor generators 42 drive the rear wheels, compared to a front-wheel drive vehicle, the vehicle in this embodiment has better acceleration performance, gradeability and steering capability. Moreover, since the second motor generators 42 independently drive the left rear wheel and the right rear wheel respectively, an electronic differential function may be achieved, thus increasing the handling stability and reducing the amount of tire wear. In a front-wheel drive part, since the association between the gear set and the front wheels is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in an engaged state, the engine unit 1 does not operate, the first motor generator 41 drives the front wheels respectively, and the second motor generators 42 drive the rear wheels respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Third Operating Condition

This operating condition is a parallel operating condition. The dual clutch 31 is in a disengaged state, the synchronizer 6 is in an engaged state, the engine unit 1 and the first motor generator 41 drive the front wheels 210 simultaneously, and the second motor generators 42 drive the rear wheels respectively. This operating condition is mainly applicable to a situation where a load is the largest, for example, during quick acceleration, or climbing steep slopes. This operating condition has the advantages that two motor generators and the engine unit drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 to generate electricity, and the second motor generators 42 drive the rear wheels respectively. This operating condition is mainly applicable to a situation where a load is medium and an electric quantity of a battery is small. This operating condition has the advantages that, since the two second motor generators independently drive the left rear wheel and the right rear wheel respectively, an electronic differential function may be achieved, thus increasing the handling stability and reducing the amount of tire wear. Compared to a front-wheel drive vehicle, the vehicle under the series operating condition has better acceleration performance, gradeability, and steering capability. Moreover, the first motor generator 41 may keep the engine unit 1 running in an optimal economic region through torque and rotating speed adjustment, thus reducing fuel consumption during the electricity generation.

Fifth Operating Condition

This operating condition is a braking/decelerating feedback operating condition. The dual clutch 31 is in a disengaged state, the synchronizer 6 is in an engaged state, the engine unit does not operate, and the first motor generator and the second motor generators brake the vehicle and generate electricity simultaneously. This operating condition has the advantages that, since three motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle. Moreover, two second motor generators may control the braking force independently, thus improving the handling stability of the vehicle during braking when turning, and further increasing the feedback energy.

Similarly, the operating conditions of the power transmission system 100 in this embodiment may be switched, and typical switching between operating conditions is switching from the fourth operating condition to the third operating condition, or switching from the fourth operating condition to the fifth operating condition. The switching between the operating conditions of the power transmission system 100 in this embodiment is similar to that in the above embodiments, so the detailed description thereof will be omitted here.

Embodiment 11

As shown in FIG. 12, the power transmission system 100 in this embodiment differs from the power transmission system 100 shown in FIG. 9 in the arrangement of the second motor generators 42. In this embodiment, one second motor generators 42 is provided, and the second motor generator 42 drives the rear wheels 220 via one third speed changing mechanism 73. Other parts in this embodiment are substantially the same as those in the power transmission system 100 in the embodiment shown in FIG. 9, so the detailed description thereof will be omitted here.

In this embodiment, the second motor generator 42 may be used to drive the vehicle separately. At this time, the dual clutch 31 and the synchronizer 6 are in a disengaged state. This operating condition is mainly applicable to a situation where a load is small and an electric quantity of a battery is large, for example, during uniform motions or under urban operating conditions. This operating condition has the advantages that, since the second motor generators 42 directly drive the rear wheels 220 via the third speed changing mechanism 73, compared to a front-wheel drive vehicle, the vehicle in this embodiment has better acceleration performance, gradeability and steering capability. In a front-wheel drive part, the synchronizer 6 is in a disengaged state, so there is no mechanical loss in the front-wheel drive part, thus reducing the energy consumption of the vehicle. In a rear-wheel drive part, a differential integrally formed with the third speed changing mechanism 73 may also be added.

In this embodiment, the power transmission system 100 may also have a pure EV four-wheel drive operating condition. At this time, the dual clutch 31 is in a disengaged state, the synchronizer 6 is in an engaged state, the engine unit 1 does not operate, the first motor generator 41 drives the front wheels 210 respectively, and the second motor generator 42 drives the rear wheels 220 respectively. This operating condition is mainly applicable to a situation where a load is large and an electric quantity of a battery is large, for example, during acceleration, climbing, overtaking, or high-speed running. This operating condition has better dynamic performance than a single-motor drive, and has better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability.

In this embodiment, the power transmission system may also have a parallel operating condition. The dual clutch 31 is in an engaged state, the synchronizer 6 is in an engaged state, the engine unit 1 and the first motor generator 41 drive the front wheels 210 simultaneously, and the second motor generator 42 drives the rear wheels 220. This operating condition is mainly applicable to a situation where a load is the largest, for example, during quick acceleration, or climbing steep slopes. This operating condition has the advantages that two motors and the engine unit 1 drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability.

In this embodiment, the power transmission system may also have a series operating condition. The dual clutch 31 is in an engaged state, the synchronizer 6 is in a disengaged state, the engine unit 1 drives the first motor generator 41 to generate electricity, and the second motor generator drives the rear wheels. This operating condition is mainly applicable to a situation where a load is medium and an electric quantity of a battery is small. This operating condition has the advantages that the second motor generator 42 drives the rear wheels, and compared to a front-wheel drive vehicle, the vehicle under the series operating condition has better acceleration performance, gradeability and steering capability. Moreover, the first motor generator 41 may keep the engine unit 1 running in an optimal economic region through torque and rotating speed adjustment, thus reducing fuel consumption during the electricity generation.

In this embodiment, the power transmission system may also have a braking/decelerating feedback operating condition. The dual clutch 31 is in a disengaged state, the synchronizer 6 is in an engaged state, the engine unit 1 does not operate, and the first motor generator 41 and the second motor generator 42 brake the vehicle and generate electricity simultaneously. This operating condition has the advantages that, since two motors brake the vehicle simultaneously during the decelerating or braking of the vehicle, the braking energy may be absorbed to the largest extent and converted into electric energy. By the disengagement of the dual clutch 31, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle.

Similarly, the operating conditions of the power transmission system 100 in this embodiment may be switched, and typical switching between operating conditions is switching from the fourth operating condition to the third operating condition, or switching from the fourth operating condition to the fifth operating condition. The switching between the operating conditions of the power transmission system 100 in this embodiment is similar to that in the above embodiments, so the detailed description thereof will be omitted here.

Embodiment 12

As shown in FIG. 13, the power transmission system 100 in this embodiment differs from the power transmission system 100 shown in FIG. 9 in the arrangement of the second motor generators 42. In this embodiment, two second motor generators 42 are provided and are wheel-side motors, and each second motor generator 42 drives a corresponding rear wheel 220. Other parts in this embodiment are substantially the same as those in the power transmission system 100 in the embodiment shown in FIG. 9, so the detailed description thereof will be omitted here.

Embodiment 13

As shown in FIG. 14, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25 by fixing, the double-linked gear structure 26 (i.e. a driven gear) is freely fitted over the output shaft 24, the first gear part 261 of the double-linked gear structure 26 is configured to mesh with the driving gear 25 on the first input shaft 21, and the second gear part 262 of the double-linked gear structure 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. Indirect power transmitting between the output terminal of the first motor generator 41 and the second intermediate shaft gear 452 via an intermediate idler 44 is performed.

The synchronizer 6 is disposed on the output shaft 24 and configured to engage with the double-linked gear structure 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 14

As shown in FIG. 15, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear structure 26 (i.e. a driven gear) is freely fitted over the output shaft 24, the first gear part 261 of the double-linked gear structure 26 is configured to mesh with the driving gear 25 on the first input shaft 21, and the second gear part 262 of the double-linked gear structure 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. The output terminal of the first motor generator 41 is configured to directly mesh with the second intermediate shaft gear 452 for power transmitting.

The synchronizer 6 is disposed on the output shaft 24 and is configured to engage with the double-linked gear structure 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 15

As shown in FIG. 16, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear structure 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22. The output terminal of the first motor generator 41 is configured to directly mesh with the first gear part 261 for power transmitting.

The synchronizer 6 is disposed on the output shaft 24 and configured to engage with the double-linked gear 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 16

As shown in FIG. 17, the power transmission system 100 in this embodiment differs from the power transmission system 100 shown in FIG. 14 in that the clutch 9 is provided instead of the synchronizer 6 of the power transmission system 100 in FIG. 14, and the driving gear 51 of the final drive is fixed on the output shaft 24.

Embodiment 17

As shown in FIG. 18, the power transmission system 100 in this embodiment differs from the power transmission system 100 shown in FIG. 15 in that the clutch 9 is provided instead of the synchronizer 6 of the power transmission system 100 in FIG. 15, and the driving gear 51 of the final drive is fixed on the output shaft 24.

Embodiment 18

As shown in FIG. 19, the power transmission system 100 in this embodiment differs from the power transmission system 100 shown in FIG. 16 in that the clutch 9 is provided instead of the synchronizer 6 of the power transmission system 100 in FIG. 16, and the driving gear 51 of the final drive is fixed on the output shaft 24.

It should be noted that, as shown in FIGS. 14-19, in an alternative embodiment of the linked gear structure 26, the power transmission system 100 may further include the second motor generator 42 and the third motor generator 43 or only include the third motor generator 43 (not shown in FIGS. 14-19), and the arrangement of the second motor generator 42 and the third motor generator 43 may be the same as that in FIGS. 2-13, for example, being in a wheel-side form, or being disposed at two sides of the differential back to back. For example, as an optional embodiment, the driving gear 51 of the final drive of the power transmission system 100 shown in FIGS. 14-19 may be configured to drive the front wheels 210, and the rear-wheel drive may be the same as that shown in FIG. 12, i.e. the rear wheels 220 are driven by one second motor generator 42 and one reducing mechanism.

In addition, embodiments of the present disclosure further provide a vehicle including the abovementioned power transmission system 100. It would be appreciated that, other components (e.g., a driving system, a steering system, and a braking system) of the vehicle according to embodiments of the present disclosure are well known to those skilled in the art, so the detailed description thereof will be omitted here.

Based on the power transmission system and the vehicle having the power transmission system that are described in the above embodiments, embodiments of the present disclosure provide a cruise control method for a vehicle, where the cruise control method for a vehicle in some embodiments of the present disclosure is executed based on a vehicle having the foregoing power transmission system. The cruise control method for a vehicle and the vehicle that executes the cruise control method according to embodiments of the present disclosure are described below in detail.

Figure 20:
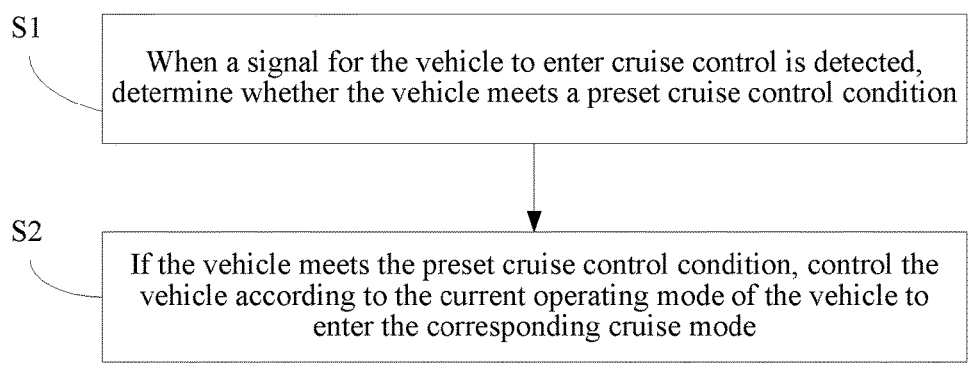
FIG. 20 is a flowchart of a cruise control method for a vehicle according to an embodiment of the present disclosure.

FIG. 20 is a flowchart of a cruise control method for a vehicle according to an embodiment of the present disclosure. The vehicle includes an engine unit, a transmission unit adapted to selectively couple with the engine unit and also configured to transmit the power generated by the engine unit, a first motor generator coupled with the transmission unit, an output unit, a power switching device, a second motor generator configured to drive at least one of front and rear wheels, and a power battery supplying power to the first motor generator and/or the second motor generator, where the output unit is configured to transmit the power transmitted by the transmission unit to at least one of front and rear wheels of the vehicle, and the power switching device is adapted to enable or interrupt power transmission between the transmission unit and the output unit. Further, the power switching device is configured as a synchronizer, and the synchronizer is adapted to selectively synchronize between the output unit and the transmission unit. As shown in FIG. 20, the cruise control method for a vehicle includes the following steps:

S1: When a signal for the vehicle to enter cruise control is detected, determine whether the vehicle meets a preset cruise control condition.

The preset cruise control condition includes: (1) the current speed V of the vehicle is greater than or equal to a preset cruise speed lower limit value Vmin and is less than or equal to a preset cruise speed upper limit value Vmax; (2) the current gear of the vehicle is gear D; (3) a braking pedal of the vehicle is not triggered; (4) a cruise control switch of the vehicle is in a normal state; (5) a speed signal of the vehicle is in a normal state; (6) a braking signal of the vehicle is in a normal state; (7) an accelerator pedal signal of the vehicle is in a normal state; (8) an electrical park brake (EPB) system does not request to cancel cruise control of the vehicle; (9) an electronic stability program (ESP) system of the vehicle is not executed; (10) the EPB/ESP of the vehicle has no failure; and (11) communication with the EPB/ESP has no failure. When any condition of the preset cruise control conditions is not met, the vehicle is controlled not to enter a corresponding cruise mode.

Figure 21:
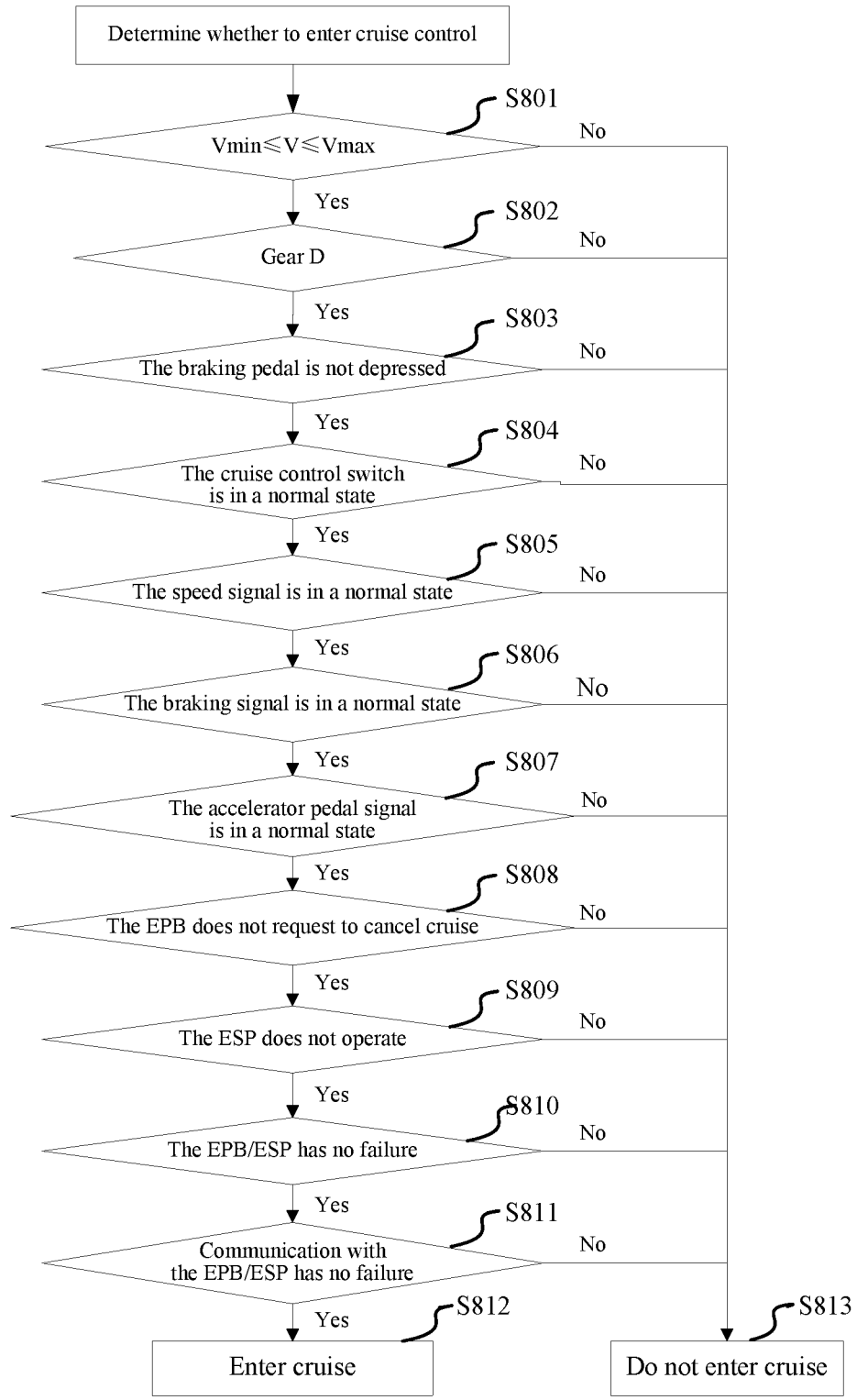
FIG. 21 is a flowchart of method for determining to enter cruise control in a cruise control method for a vehicle according to an embodiment of the present disclosure.

In an embodiment of the present disclosure, as shown in FIG. 21, a method for determining to enter cruise control in the foregoing cruise control method for a vehicle specifically includes the following steps:

S801: When a signal to enter cruise control is detected, compare the current speed V with the preset cruise speed upper limit value Vmax and the lower limit value Vmin, and determine whether the current speed V is within a range [Vmin, Vmax]. If yes, perform Step S802; or if not, perform Step S813.

S802: Determine whether the current gear is gear D. If yes, perform Step S803; or if not, perform Step S813.

S803: Determine whether the braking pedal is not depressed. If yes, perform Step S804; or if not, perform Step S813.

S804: Determine whether the cruise control switch is in a normal state. If yes, perform Step S805; or if not, perform Step S813.

S805: Determine whether the speed signal is in a normal state. If yes, perform Step S806; or if not, perform Step S813.

S806: Determine whether the braking signal is in a normal state. If yes, perform Step S807; or if not, perform Step S813.

S807: Determine whether the accelerator pedal signal is in a normal state. If yes, perform Step S808; or if not, perform Step S813.

S808: Determine whether the EPB does not request to cancel cruise. If yes, perform Step S809; or if not, perform Step S813.

S809: Determine whether the ESP does not operate. If yes, perform Step S810; or if not, perform Step S813.

S810: Determine whether the EPB/ESP has no failure. If yes, perform Step S811; or if not, perform Step S813.

S811: Determine whether communication with the EPB/ESP has no failure. If yes, perform Step S812; or if not, perform Step S813.

S812: Control the vehicle to enter the corresponding cruise mode.

S813: Control the vehicle not to enter the corresponding cruise mode.

In an embodiment of the method for determining a preset cruise control condition, the controller determines the speed of the vehicle, the gear, the state of the braking pedal, the state of the cruise control switch, the state of the speed signal, the state of the braking signal, the state of the accelerator pedal signal, a signal that the EPB requests to cancel cruise, whether the ESP does not operate, a failure state of the EPB/ESP, and a communication state of the EPB/ESP. When the foregoing conditions all meet requirements of cruise control, the vehicle is controlled to enter a corresponding cruise mode. When any one condition of the foregoing conditions does not meet a requirement of cruise control, the vehicle is controlled not to enter the corresponding cruise mode.

S2: If the vehicle meets the preset cruise control condition, control the vehicle according to the current operating mode of the vehicle to enter the corresponding cruise mode. When the current operating mode of the vehicle is a pure electric vehicle (EV) mode, control the vehicle to enter an EV cruise mode. When the current operating mode of the vehicle is a hybrid electric vehicle (HEV) mode, control the vehicle to enter an HEV cruise mode.

Figure 22:
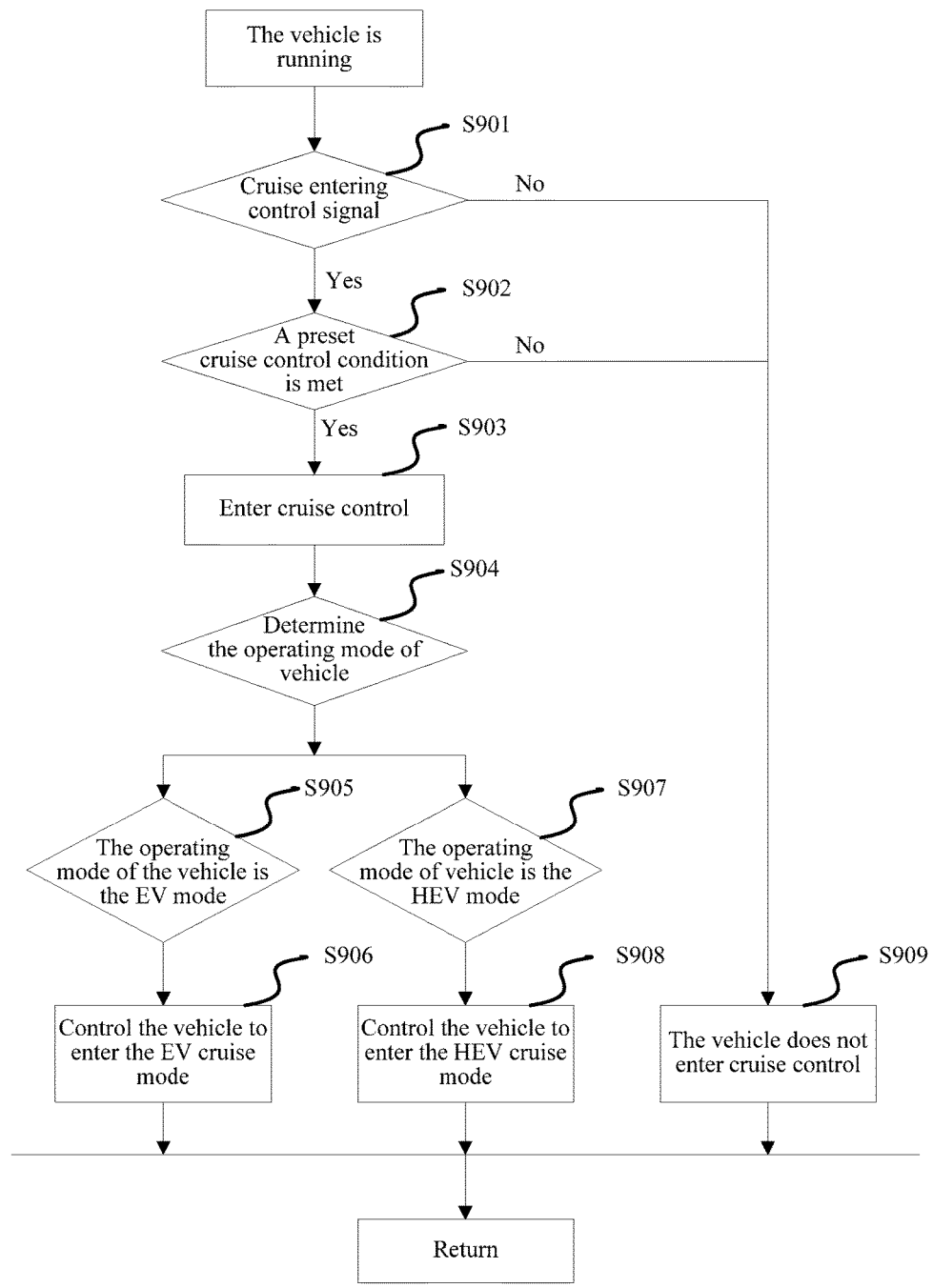
FIG. 22 is a flowchart of a cruise control method for a vehicle according to an embodiment of the present disclosure.

In an embodiment of the present disclosure, as shown in FIG. 22, the foregoing cruise control method for a vehicle includes the following steps:

S901: The controller detects a cruise control signal, to detect whether there is a cruise entering control signal; and if yes, perform Step S902; or if not, perform Step S909.

S902: When a cruise entering control signal is detected, determine whether the vehicle meets the preset cruise control condition. If yes, perform Step S903; or if not, perform Step S909.

S903: When the vehicle meets the preset cruise control condition, enter cruise control.

S904: Determine the current operating mode of vehicle, and determine whether the vehicle is working in the EV mode or in the HEV mode.

S905: When the operating mode of the vehicle is the EV mode, enter Step S906.

S906: Control the vehicle to enter the EV cruise mode, that is, the vehicle performs control according to an EV mode cruise strategy.

S907: When the operating mode of the vehicle is the HEV mode, enter Step S908.

S908: Control the vehicle to enter an HEV cruise mode, that is, the vehicle performs control according to the HEV mode cruise strategy.

S909: When any condition of the preset cruise control conditions is not met, the vehicle does not enter cruise control.

In some embodiments of the present disclosure, a condition for entering cruise control is determined. When all preset cruise control conditions are met, the vehicle enters cruise. In addition, the EV mode cruise strategy and the HEV mode cruise strategy are respectively provided for different operating modes of the vehicle, so as to meet cruise requirements of an automobile of a user in different operating modes. A control method for the EV cruise mode and a control method for the HEV cruise mode are respectively described below by using two specific embodiments.

In an embodiment of the present disclosure, when the vehicle is in the EV cruise mode, if a current state of charge (SOC) of the power battery of the vehicle is greater than a first electric quantity threshold value SOC1, a maximum allowable discharge power Pb of the power battery is greater than a preset power threshold value Pb1, and the current slope i of the vehicle is less than the slope threshold value i1, a required torque Tc of the vehicle is calculated, and the second motor generator is controlled to output the required torque, and when an output torque upper limit Tm2 of the second motor generator is less than the required torque Tc, the first motor generator is controlled to perform torque compensation output. If the current SOC of the power battery is less than or equal to the first electric quantity threshold value SOC1, the maximum allowable discharge power SOC1 of the power battery is less than or equal to the preset power threshold value Pb1 or the current slope i of the vehicle is greater than or equal to the slope threshold value i1, the engine unit is controlled to start, and the vehicle is controlled to enter an HEV cruise mode.

Figure 23:
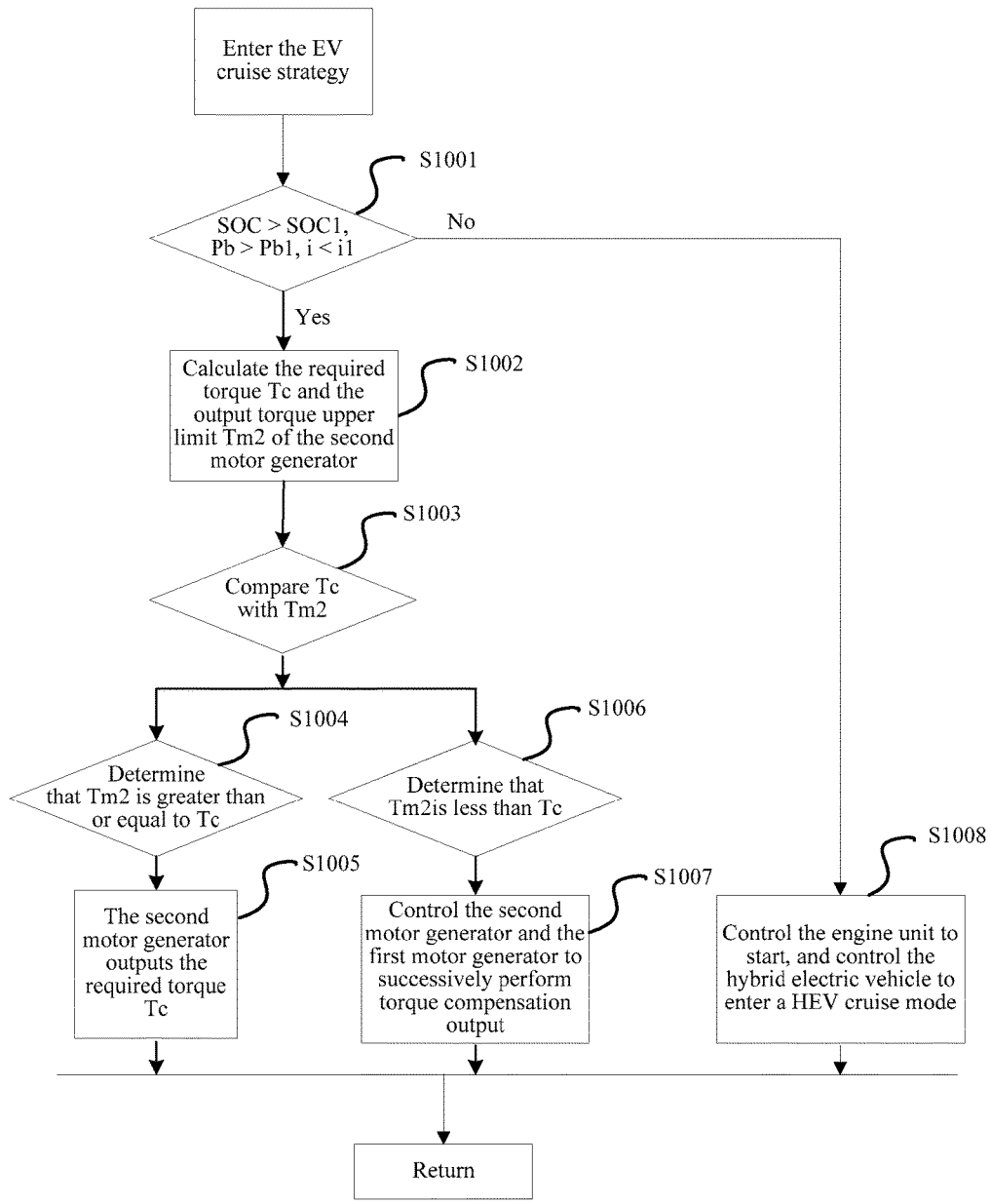
FIG. 23 is a flowchart of a cruise control method for a vehicle when a vehicle enters an EV cruise mode according to an embodiment of the present disclosure.

In an embodiment of the present disclosure, as shown in FIG. 23, when the vehicle enters the EV cruise mode, the cruise control method for a vehicle includes the following steps:

S1001: Compare the current SOC of the power battery, the maximum allowable discharge power Pb of the power battery, and the current slope i of the vehicle with the first electric quantity threshold value SOC1, the preset power threshold value Pb1, and the slope threshold value i1 respectively, to determine Whether SOC is greater than SOC1, whether Pb is greater than Pb1, and whether i is less than i1. If yes, perform Step S1002; or if not, perform Step S1008.

S1002: When SOC is greater than SOC1, Pb is greater than Pb1, and i is less than i1, calculate the required torque Tc of the current cruise mode of the vehicle, and calculate the output torque upper limit Tm2 of the second motor generator.

S1003: Compare the required torque Tc of the current cruise mode of the vehicle with the output torque upper limit Tm2 of the second motor generator, to determine the range of the required torque Tc of the current cruise mode.

S1004: When it is determined that the output torque upper limit Tm2 of the second motor generator is greater than or equal to the required torque Tc, perform Step S1005.

S1005: Control the second motor generator according to the required torque to output the torque to be the required torque Tc, and end the process. That is, when the current SOC is greater than the first electric quantity threshold value SOC1, the maximum allowable discharge power Pb is greater than the preset power threshold value Pb1, the current slope i is less than the slope threshold value i1, and the output torque Tm2 of the second motor generator is greater than or equal to the required torque Tc, the controller controls the output torque of the second motor generator to be Tc.

S1006: When it is determined that the output torque upper limit Tm2 of the second motor generator is less than the required torque Tc, perform Step S1007.

S1007: Control the second motor generator and the first motor generator to successively perform torque compensation output, and end the process. That is, when the current SOC is greater than the first electric quantity threshold value SOC1, the maximum allowable discharge power Pb is greater than the preset power threshold value Pb1, the current slope i is less than the slope threshold value i1, and the output torque upper limit Tm2 of the second motor generator is less than the required torque Tc, the second motor generator performs output according to the output torque upper limit Tm2 of the second motor generator, and the first motor generator compensates for the remaining torque, that is, the output of the first motor generator is Tc-Tm2. In other words, the second motor generator is first controlled to perform torque output, and for a difference between the output of the second motor generator and the required torque, the first motor generator is controlled to perform torque compensation output.

S1008: Control the engine unit to start, and control the vehicle to enter an HEV cruise mode.

In other words, when the current SOC of the power battery is less than or equal to the first electric quantity threshold value SOC1 or the maximum allowable discharge power Pb of the power battery is less than or equal to the preset power threshold value Pb1 or the current slope i of the vehicle is greater than or equal to the slope threshold value i1, control the engine unit to start, and control the vehicle to enter the HEV cruise mode.

In an embodiment of a cruise control method for an EV mode, the current SOC of the power battery, the maximum allowable discharge power Pb of the power battery, and the current slope i of the vehicle are respectively compared with the first electric quantity threshold value SOC1, the preset power threshold value Pb1, and the slope threshold value i1. If the current SOC of the power battery, the maximum allowable discharge power Pb of the power battery, and the current slope i of the vehicle all meet the requirements for cruise control, the second motor generator is used as a dynamic source to perform cruise driving, or the second motor generator and the first motor generator are used as dynamic sources to perform cruise driving, so as to meet a pure EV running requirement of a user. If the current SOC of the power battery or the maximum allowable discharge power Pb of the power battery or the current slope i of the vehicle cannot meet the requirement for cruise control, and the motor cannot maintain the current cruise speed, the engine unit is started to control the vehicle to switch to the HEV cruise control strategy, to ensure the capability of keeping normal cruise of the vehicle. In the EV cruise mode, according to different required torques Tc of the current cruise mode, different driving distribution strategies of the first motor generator and the second motor generator are provided.

In an embodiment of the present disclosure, when the vehicle enters the HEV cruise mode, the required torque Tc of the vehicle is calculated, so that in a low-electric quantity strategy, if the current SOC of the power battery of the vehicle is less than the second electric quantity threshold value SOC2 and the output torque upper limit of the engine unit is greater than the required torque, the engine unit is controlled to output the required torque. When the vehicle is running in an economical mode, the engine unit is controlled to drive the first motor generator to generate electricity. If the output torque upper limit of the engine unit is less than the required torque, the second motor generator and the first motor generator are controlled to successively perform torque compensation output. In an intermediate-electric quantity strategy, if the current SOC of the power battery of the vehicle is greater than or equal to the second electric quantity threshold value SOC2 and is less than or equal to the third electric quantity threshold value SOC3 and the output torque upper limit of the engine unit is greater than the required torque, the engine unit is controlled to output the required torque, where the third electric quantity threshold value SOC3 is greater than the second electric quantity threshold value SOC2. If the output torque upper limit of the engine unit is less than the required torque, the second motor generator and the first motor generator are controlled to successively perform torque compensation output. In a high-electric quantity strategy, if the current SOC of the power battery of the vehicle is greater than the third electric quantity threshold value SOC3 and the output torque upper limit of the second motor generator is greater than the required torque, the second motor generator is controlled to output the required torque. If the output torque upper limit of the second motor generator is less than the required torque, the engine unit and the first motor generator are controlled to successively perform torque compensation output.

Figure 24:
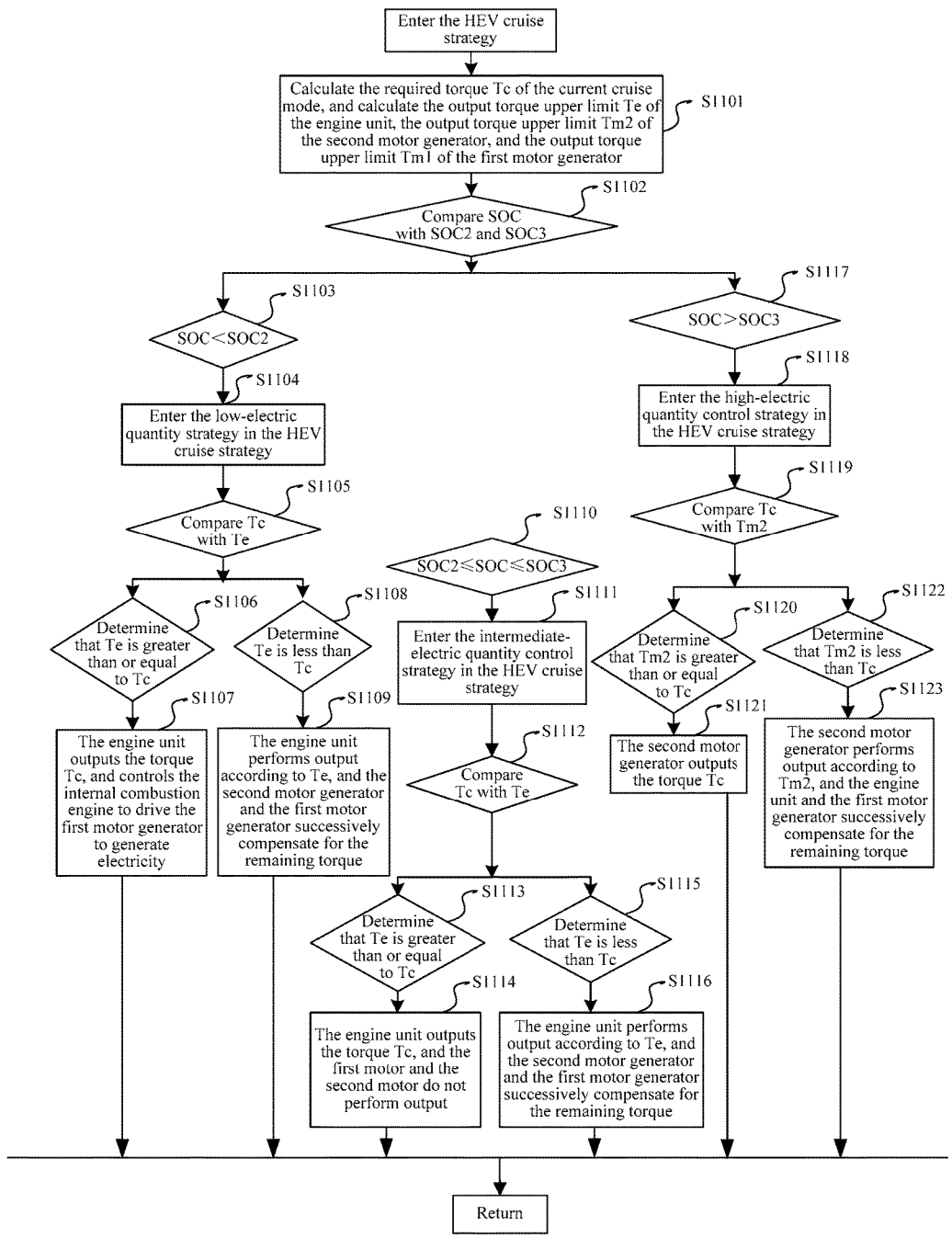
FIG. 24 is a flowchart of a cruise control method for a vehicle when a vehicle enters an HEV cruise mode according to another embodiment of the present disclosure.

In an embodiment of the present disclosure, as shown in FIG. 24, when the vehicle enters the HEV cruise mode, the cruise control method for a vehicle includes the following steps:

S1101: Calculate the required torque Tc of the current cruise mode of the vehicle, and calculate the output torque upper limit Te of the engine unit, the output torque upper limit Tm2 of the second motor generator, and the output torque upper limit Tm1 of the first motor generator.

S1102: Compare the current electric quantity SOC of the power battery with the second electric quantity threshold value SOC2 and the third electric quantity threshold value SOC3, to determine the range of SOC, and perform Step S1103 or Step S1110 or Step S1117 according to the range of SOC.

The third electric quantity threshold value SOC3 is greater than the second electric quantity threshold value SOC2.

S1103: When it is determined that the current SOC of the power battery of the vehicle is less than the second electric quantity threshold value SOC2, perform Step S1104.

S1104: Enter the low-electric quantity strategy.

S1105: Compare the required torque Tc of the current cruise mode of the vehicle with the output torque upper limit Te of the engine unit, to determine the range of the required torque Tc of the current cruise mode.

S1106: When it is determined that the output torque upper limit Te of the engine unit is greater than or equal to the required torque Tc, perform Step S1107.

S1107: The engine unit outputs the torque Tc, the first motor and the second motor do not perform output, and within the economic region, controls the engine unit to drive the first motor generator to generate electricity. That is, after the vehicle enters the HEV cruise mode, if it is determined that the current SOC of the power battery of the vehicle is less than the second electric quantity threshold value SOC2, and when the output torque upper limit Te of the engine unit is greater than or equal to the required torque Tc of the vehicle, the engine unit is controlled to output a torque according to the required torque Tc of the vehicle.

S1108: When it is determined that the output torque upper limit Te of the engine unit is less than the required torque Tc, perform Step S1109.

S1109: The engine unit performs output according to the output torque upper limit Te of the engine unit, the second motor generator and the first motor generator successively compensate for the remaining torque, and the output torque of the second motor generator and the first motor generator is Tc-Te. In other words, when the vehicle enters the HEV cruise mode, if it is determined that the current SOC of the power battery of the vehicle is less than the second electric quantity threshold value SOC2, and when the output torque upper limit Te of the engine unit is less than required torque Tc, the engine unit is controlled to output the output torque upper limit Te of the engine unit, and according to the method shown in FIG. 4 in some embodiments of the present disclosure, the second motor generator is first controlled to perform torque compensation output, and when the second motor generator also cannot fully compensate for the remaining torque, the first motor generator is then controlled to perform torque compensation output.

S1110: When it is determined that the current SOC of the power battery of the vehicle is greater than or equal to the second electric quantity threshold value SOC2 and is less than or equal to the third electric quantity threshold value SOC3, perform Step S1111.

The third electric quantity threshold value SOC3 is greater than the second electric quantity threshold value SOC2.

S1111: Enter the intermediate-electric quantity control strategy.

S1112: Compare the required torque Tc of the current cruise mode of the vehicle with the output torque upper limit Te of the engine unit, to determine the range of the required torque Tc of the current cruise mode.

S1113: When it is determined that the output torque upper limit Te of the engine unit is greater than or equal to the required torque Tc, perform Step S1114.

S1114: The engine unit outputs the torque Tc, and the first motor and the second motor do not perform output. That is, after the vehicle enters the HEV cruise mode, if it is determined that the current SOC of the power battery of the vehicle is greater than or equal to the second electric quantity threshold value SOC2 and is less than or equal to the third electric quantity threshold value SOC3, and when the output torque upper limit Te of the engine unit is greater than or equal to the required torque Tc of the vehicle, the engine unit is controlled to output a torque according to the cruise required torque Tc of the vehicle.

S1115: When it is determined that the output torque upper limit Te of the engine unit is less than the required torque Tc, perform Step S1116.

S1116: The engine unit performs output according to the output torque upper limit Te of the engine unit, and the second motor generator and the first motor generator successively compensate for the remaining torque, where the output torque upper limit of the second motor generator and the first motor generator is Tc-Te. In other words, when the vehicle enters the HEV cruise mode, if it is determined that the current SOC of the power battery of the vehicle is greater than or equal to the second electric quantity threshold value SOC2 and is less than or equal to the third electric quantity threshold value SOC3, and when the output torque upper limit Te of the engine unit is less than the required torque Tc, the engine unit is controlled to output the output torque upper limit Te of the engine unit, and according to the method shown in FIG. 4 in some embodiments of the present disclosure, the second motor generator is first controlled to perform torque compensation output, and when the second motor generator also cannot fully compensate for the remaining torque, the first motor generator is controlled to perform torque compensation output.

S1117: When it is determined that the current SOC of the power battery of the vehicle is greater than the third electric quantity threshold value SOC3, perform Step S1118.

S1118: Enter the high-electric quantity control strategy, calculate the required torque Tc of the current cruise mode of the vehicle, and calculate the output torque upper limit Te of the engine unit, the output torque upper limit Tm2 of the second motor generator, and the output torque upper limit Tm1 of the first motor generator.

S1119: Compare the required torque Tc of the current cruise mode of the vehicle with the output torque upper limit Tm2 of the second motor generator, and determine the range of the required torque Tc of the current cruise mode.

S1120: When it is determined that the output torque upper limit Tm2 of the second motor generator is greater than or equal to the required torque Tc, perform Step S1121.

S1121: The torque output by the second motor generator is the required torque Tc. That is, after the vehicle enters the HEV cruise mode, if it is determined that the current SOC of the power battery of the vehicle is greater than the third electric quantity threshold value SOC3, and when the output torque upper limit Tm2 of the second motor generator is greater than or equal to the required torque Tc, the second motor generator is controlled to output a torque according to the required cruise torque Tc of the vehicle.

S1122: When it is determined that the output torque upper limit Tm2 of the second motor generator is less than the required torque Tc, perform Step S1123.

S1123: The second motor generator performs output according to the output torque upper limit Tm2 of the second motor generator, and the engine unit and the first motor generator successively compensate for the remaining torque, where the output torque of the engine unit and the first motor generator is Tc-Tm2. In other words, when the vehicle enters the HEV cruise mode, if it is determined that the current SOC of the power battery of the vehicle is greater than the third electric quantity threshold value SOC3, and when the output torque upper limit Tm2 of the second motor generator is less than the required torque Tc, the second motor generator is controlled to output the output torque upper limit Tm2 of the second motor generator, the engine unit is first controlled to perform torque compensation output, and when the engine unit also cannot fully compensate for the remaining torque, the first motor generator is then controlled to perform torque compensation output.

In an embodiment of the cruise control method for an HEV mode, the electric quantity SOC of the battery is compared with the second electric quantity threshold value SOC2, the third electric quantity threshold value SOC3. According to three ranges of the electric quantity SOC of the battery, the cruise control method for an HEV mode is correspondingly classified into the low-electric quantity strategy, the intermediate-electric quantity strategy, and the high-electric quantity strategy, and different power distribution strategies for the engine unit, the first motor generator, and the second motor generator are separately provided for the foregoing three strategies. Generally, in the low-electric quantity strategy, according to the required torque Tc, the engine unit first performs driving, and within the economic region, the engine unit is controlled to drive the first motor generator to generate electricity. For the insufficient part of the torque, the second motor generator and the first motor generator then successively perform torque compensation output. In the intermediate-electric quantity strategy, according to the required torque Tc, the engine unit performs driving first, and for the insufficient part of the torque, the second motor generator and the first motor generator then successively perform torque compensation output. In the high-electric quantity strategy, according to the required torque Tc, the second motor generator first performs driving, and for the insufficient part of the torque, the engine unit and the first motor generator then successively perform torque compensation output.

Figure 25:
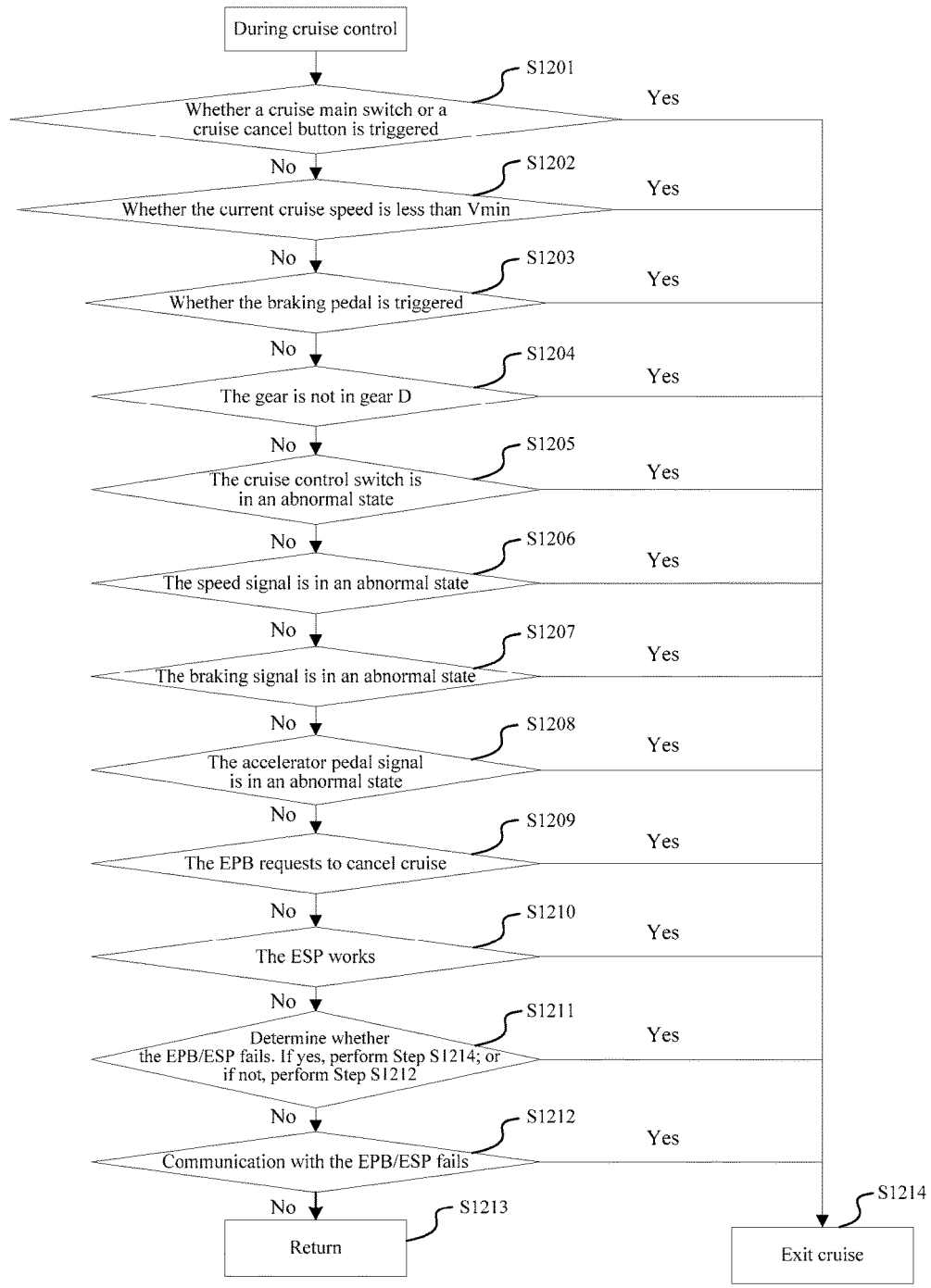
FIG. 25 is a flowchart of a method for determining to exit cruise control in a cruise control method for a vehicle according to still another embodiment of the present disclosure.

In addition, in still another embodiment of the present disclosure, when the vehicle is in the cruise mode, if any condition of the preset cruise control conditions is not met or when a signal for the vehicle to exit cruise control is detected, the vehicle is controlled to exit the corresponding cruise mode. The preset cruise control condition is described in Step S1, and is no longer elaborated herein. As shown in FIG. 25, a method for determining to exit cruise in the foregoing cruise control method for a vehicle specifically includes the following steps:

S1201: Determine whether a cruise main switch or a cruise cancel button is triggered, that is, is pressed. If yes, perform Step S1214; or if not, perform Step S1202.

In other words, it is determined whether a signal for the vehicle to exit cruise control is detected.

S1202: Determine whether the current cruise speed V is less than the preset lower limit value Vmin. If yes, perform Step S1214; or if not, perform Step S1203.

S1203: Determine whether the braking pedal is depressed. If yes, perform Step S1214; or if not, perform Step S1204.

S1204: Determine whether the current gear is changed to a gear other than gear D. If yes, perform Step S1214; or if not, perform Step S1205.

S1205: Determine whether the cruise control switch is in an abnormal state. If yes, perform Step S314; or if not, perform Step S1206.

S1206: Determine whether the speed signal is in an abnormal state. If yes, perform Step S1214; or if not, perform Step S1207.

S1207: Determine whether the braking signal is in an abnormal state. If yes, perform Step S1214; or if not, perform Step S1208.

S1208: Determine whether the accelerator pedal signal is in an abnormal state. If yes, perform Step S1214; or if not, perform Step S1209.

S1209: Determine whether the EPB requests to cancel cruise. If yes, perform Step S1214; or if not, perform Step S1210.

S1210: Determine whether the ESP works. If yes, perform Step S1214; or if not, perform Step S1211.

S1211: Determine whether the EPB/ESP fails. If yes, perform Step S1214; or if not, perform Step S1212.

S1212: Determine whether communication with the EPB/ESP fails. If yes, perform Step S1214; or if not, perform Step S1213.

S1213: Control the vehicle to continue with cruise, and the process returns to S1201.

If during the cruise process, none of the conditions in Step S1201 to Step S1212 is met, continue with the cruise, and determining is performed cyclically from Step S1201 to Step S1212 during the cruise.

S1214: Control the vehicle to exit the cruise mode, where the cruise mode cannot automatically restore.

If during the cruise, any one condition in Step S1201 to Step S1212 is met, the vehicle is controlled to exit the cruise mode.

In an embodiment of determining to exit cruise of the present disclosure, the controller performs determining on a user operation or a related factor that affects cruise, for example, performs determining on the states of the cruise main switch and the cancel button, the gear, the speed of the vehicle, the state of the braking pedal, the state of the cruise control switch, the state of the speed signal, the state of the braking signal, the state of the accelerator pedal signal, the signal that the EPB requests to cancel cruise, whether the ESP works, a failure state of the EPB/ESP, and a communication state of the EPB/ESP. If none of the foregoing conditions is met, continue with the current cruise control. If any one of the foregoing conditions is met, to ensure safety of a user, the vehicle exits cruise control, and the cruise mode cannot automatically restore, that is, after the vehicle exits cruise, if the user does not enter a cruise operation again, the vehicle cannot automatically restore the cruise mode.

In the cruise control method for a vehicle of the present disclosure, the vehicle may cruise in operating modes: the EV mode and the HEV mode, and cruise control strategies in the two operating modes are provided. The cruise control strategies are, for example, a control strategy for an EV cruise mode in which the first motor generator and the second motor generator are used to perform torque output to perform cruise and a control strategy for an HEV cruise mode in which the engine unit, the first motor generator, and the second motor generator jointly perform output to perform cruise. When the cruise control strategy for the EV mode cannot meet a cruise requirement, the engine unit is automatically started, and the vehicle is switched to the cruise control strategy for the HEV mode. In addition, the control method for entering cruise and exiting cruise is added. Therefore, safety of a user can be ensured while a normal cruise function of the vehicle is ensured.

In addition, it should be noted that, there may be a plurality of second motor generators in some embodiments of the present disclosure, and the plurality of second motor generators is disposed corresponding to a plurality of wheels. In other words, each wheel corresponds to one second motor generator.

According to the cruise control method for a vehicle in some embodiments of the present disclosure, a user can control the vehicle to cruise in an EV mode and an HEV mode, so that a pure EV cruise requirement of the user can be met, and fuel consumption can be reduced. It can also be ensured that when the pure EV cannot meet the cruise requirement, the vehicle automatically switches to a cruise control strategy for an HEV mode, so that it is ensured that the user can perform cruise driving continuously and reliably. The cruise control strategies in two different operating modes meet different driving requirements of the user, so as to implement combination of selection of a driving mode and an automatic cruise function for running at a constant speed, and bring convenience to driving while fuel consumption can be reduced, making it more economical and environmentally friendly. From the perspective of the safety of a user, preset cruise enter conditions that may affect the driving safety of the user are added, and when any condition is not met, the vehicle does not enter cruise; and preset cruise exit conditions that may affect the driving safety of the user are further added, and when any condition is met, the vehicle automatically exits cruise, so the safety of the user can be further ensured while a normal cruise function of the vehicle is ensured. Moreover, in some embodiments of the present disclosure, power output by the engine unit and/or a first motor generator may be output to an output unit via a power switching device, and the output unit then outputs the power to at least one of front and rear wheels of the vehicle. Meanwhile, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

Figure 26:
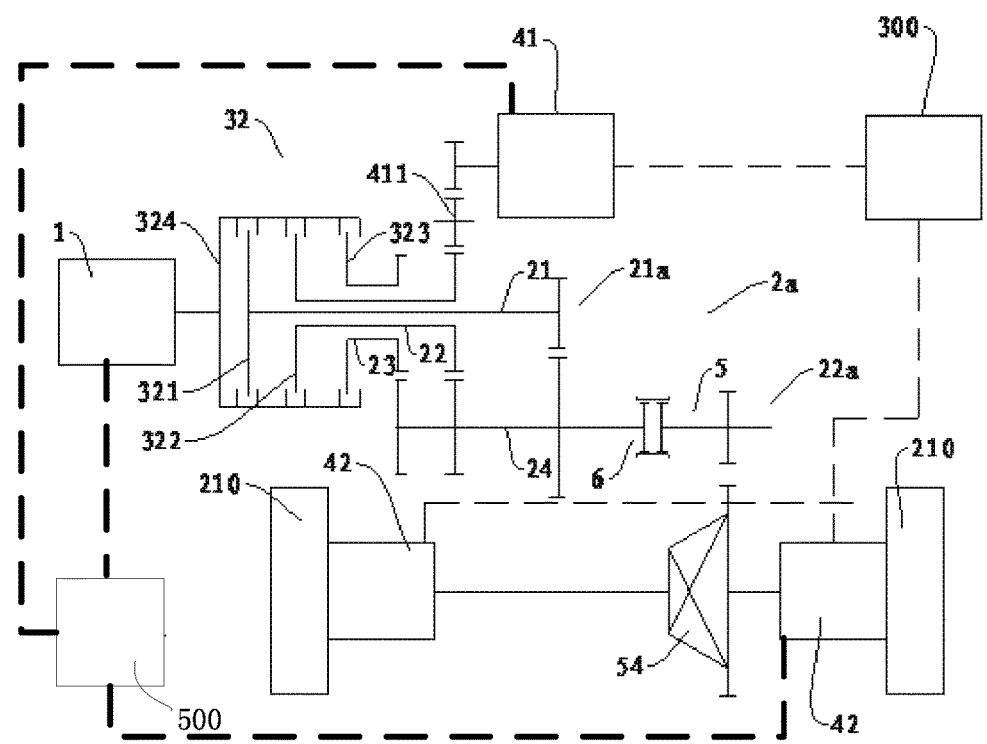
FIG. 26 is a schematic view of a vehicle according to an embodiment of the present disclosure.

Embodiments of the present disclosure further provide a vehicle that executes the cruise control method. As shown in FIG. 26, the vehicle includes: an engine unit 1, a transmission unit 2a, a first motor generator 41, an output unit 5, a power switching device (e.g., a synchronizer 6), a second motor generator 42, a power battery 300, and a controller 500. In addition, for other components in FIG. 26, refer to the description in the embodiment corresponding to FIG. 8.

The transmission unit 2a is adapted to selectively be coupled with the engine unit 1. The first motor generator 41 is coupled with the transmission unit 2a. The output unit 5 is configured to transmit the power transmitted by the transmission unit 2a to at least one of front and rear wheels of the vehicle. The power switching device (e.g., the synchronizer 6) is adapted to enable or interrupt power transmission between the transmission unit 2a and the output unit 5. The second motor generator 42 is configured to drive the front wheels or rear wheels. The power battery 300 is connected to the first motor generator 41 and/or the second motor generator 42 to supply power to the first motor generator 41 and/or the second motor generator 42.

It should be noted that, there may be a plurality of second motor generators 42, and the plurality of second motor generators 42 is disposed corresponding to the plurality of wheels. In other words, each wheel corresponds to one second motor generator 42.

Further, in some embodiments of the present disclosure, the power switching device may be configured as a synchronizer 6, and the synchronizer 6 is adapted to selectively synchronize with the output unit 5 and the transmission unit 2a.

In some embodiments of the present disclosure, when a signal for the vehicle to enter cruise control is detected, the controller 500 determines whether the vehicle meets a preset cruise control condition, and when the vehicle meets the preset cruise control condition, the controller 500 controls the vehicle according to the current operating mode of the vehicle to enter a corresponding cruise mode, where when the current operating mode of the vehicle is an EV mode, the controller 500 controls the vehicle to enter an EV cruise mode, and when the current operating mode of the vehicle is an HEV mode, the controller 500 controls the vehicle to enter an HEV cruise mode.

In an embodiment of the present disclosure, the preset cruise control condition may include: (1) the current speed of the vehicle is greater than or equal to a preset cruise speed lower limit value and is less than or equal to a preset cruise speed upper limit value; (2) the current gear of the vehicle is gear D; (3) a braking pedal of the vehicle is not triggered; (4) a cruise control switch of the vehicle is in a normal state; (5) a speed signal of the vehicle is in a normal state; (6) a braking signal of the vehicle is in a normal state; (7) an accelerator pedal signal of the vehicle is in a normal state; (8) an electrical park brake (EPB) system of the vehicle does not request to cancel cruise control of the vehicle; (9) an electronic stability program (ESP) system of the vehicle is not executed; (10) the EPB/ESP of the vehicle has no failure; and (11) communication with the EPB/ESP has no failure. When any condition of the preset cruise control conditions is not met, the controller 500 controls the vehicle not to enter a corresponding cruise mode. When the vehicle is in the cruise mode, if any condition of the preset cruise control conditions is not met or when a signal for the vehicle to exit cruise control is detected, the vehicle is controlled to exit the corresponding cruise mode. Therefore, safety of a user can be further ensured while it is ensured that the vehicle maintains a normal cruise function.

In an embodiment of the present disclosure, when the vehicle is in an EV cruise mode, if a current SOC of the power battery 300 is greater than a first electric quantity threshold value SOC1, a maximum allowable discharge power Pb of the power battery is greater than a preset power threshold value Pb1, and the current slope i of the vehicle is less than a slope threshold value i1, the controller 500 calculates the required torque Tc of the vehicle, and controls the second motor generator to output a required torque Tc, and when an output torque upper limit Tm2 of the second motor generator is less than the required torque Tc, the first motor generator 41 is controlled to perform torque compensation output. If the current SOC of the power battery 300 is less than or equal to the first electric quantity threshold value SOC1, the maximum allowable discharge power Pb of the power battery 300 is less than or equal to the preset power threshold value Pb1 or the current slope i of the vehicle is greater than or equal to the slope threshold value i1, the controller 500 controls the engine unit 1 to start, and controls the vehicle to enter the HEV cruise mode.

In an embodiment of the EV cruise mode, the current SOC of the power battery 300, the maximum allowable discharge power Pb of the power battery 300, the current slope i of the vehicle, the first electric quantity threshold value SOC1, the preset power threshold value Pb1, and the slope threshold value i1 respectively are determined. If the current SOC of the power battery 300, the maximum allowable discharge power Pb of the power battery 300, and the current slope i of the vehicle all meet the requirements for cruise control, the second motor generator 42 is used as a dynamic source to perform cruise driving, or the second motor generator 42 and the first motor generator 41 are used as dynamic sources to perform cruise driving, thus meeting a pure EV running requirement of the user. If the current SOC of the power battery 300 or the maximum allowable discharge power Pb of the power battery 300 or the current slope i of the vehicle cannot meet the requirement for cruise control, the motor cannot maintain the current cruise speed, so that the engine unit 1 is started, and the vehicle is controlled to switch an HEV cruise control strategy, thus ensuring a capability of maintaining normal cruise of the vehicle. In the EV cruise mode, according to different required torques Tc of the current cruise mode, different driving distribution strategies for the first motor generator and the second motor generator are provided.

In another embodiment of the present disclosure, when the vehicle enters the HEV cruise mode, the controller 500 calculates the required torque of the vehicle. If the current SOC of the power battery 300 is less than the second electric quantity threshold value SOC2 and an output torque upper limit Te of the engine unit 1 is greater than the required torque Tc, the controller 500 controls the engine unit 1 to output the required torque, and when the vehicle is running in an economical mode, the engine unit 1 is controlled to drive the first motor generator 41 to generate electricity. If the output torque upper limit Te of the engine unit 1 is less than the required torque Tc, the controller 500 controls the second motor generator 42 and the first motor generator 41 to successively perform torque compensation output.

In an embodiment, if the current SOC of the power battery 300 is greater than or equal to the second electric quantity threshold value SOC2 and is less than or equal to the third electric quantity threshold value SOC3 and the output torque upper limit Te of the engine unit 1 is greater than the required torque Tc, the controller 500 controls the engine unit 1 to output the required torque, where the third electric quantity threshold value SOC3 is greater than the second electric quantity threshold value SOC2. If the output torque upper limit Te of the engine unit 1 is less than the required torque Tc, the controller 500 controls the second motor generator 42 and the first motor generator 41 to successively perform torque compensation output.

In an embodiment, if the current SOC of the power battery 300 is greater than the third electric quantity threshold value SOC3 and the output torque upper limit Tm2 of the engine unit 1 is greater than the required torque Tc, the controller 500 controls the second motor generator 42 to output the required torque Tc. If the output torque upper limit Tm2 of the second motor generator 42 is less than the required torque Tc, the controller 500 controls the engine unit 1 and the first motor generator 41 to successively perform torque compensation output.

In an embodiment of the HEV cruise mode, the electric quantity SOC of the battery is compared with the second electric quantity threshold value SOC2 and the third electric quantity threshold value SOC3, and according to three ranges of the electric quantity SOC of the battery, a cruise control method for an HEV mode is correspondingly classified into a low-electric quantity strategy, an intermediate-electric quantity strategy, and a high-electric quantity strategy, and different power distribution strategies for the engine unit 1, the first motor generator 41, and the second motor generator 42 are provided respectively for the foregoing three strategies. Generally speaking, in the low-electric quantity strategy, according to the required torque Tc, the engine unit 1 first performs driving, and within the economic region, the engine unit 1 is controlled to drive the first motor generator 41 to generate electricity, and for the insufficient part of the torque, the second motor generator 42 and the first motor generator 41 then successively perform torque compensation output. In the intermediate-electric quantity strategy, according to the required torque Tc, the engine unit 1 first performs driving, and for the insufficient part of the torque, the second motor generator 42 and the first motor generator 41 successively perform torque compensation output. In the high-electric quantity strategy, according to the required torque Tc, the second motor generator 42 first performs driving, and for the insufficient part of the torque, the engine unit 1 and the first motor generator 41 then successively perform torque compensation output.

According to the vehicle in some embodiments of the present disclosure, combination of selection of a driving mode and an automatic cruise function for running at a constant speed is implemented, so as to meet different driving requirements of drivers, and bring convenience to driving while fuel consumption can be reduced, making it more economical and environmentally friendly. Moreover, power output by the engine unit and/or a first motor generator may be output to an output unit via a power switching device, and the output unit then outputs the power to at least one of front and rear wheels of the vehicle. Meanwhile, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

Any processes or methods described in the flowcharts or in other manners may be understood as modules, segments or parts of code including one or more executable instructions configured to implement steps of specific logic functions or processes, and the scope of the preferred implementation manners of the present disclosure includes other implementations. The functions may be executed in an order other than those shown or discussed. For example, the functions are executed substantially at the same time according to the involved functions or the functions are executed in an opposite order, which should be understood by those skilled in the art to which embodiments of the present disclosure belong.

The logic and/or steps represented in the flowcharts or described herein in other manners may be, for example, regarded as a sequenced list of executable instructions for implementing logic functions, and may be specifically implemented in any computer readable medium for use by instruction execution systems, devices or equipment (for example, a computer-based system, a system including a processor or another system that may take an instruction from instruction execution systems, devices or equipment and execute the instruction), or for use in combination with these instruction execution systems, devices or equipment. As for this specification, the "computer readable medium" may be any device that may include, store, communicate, propagate or transmit a program for use by instruction execution systems, devices or equipment or for use in combination with these instruction execution systems, devices or equipment. A more specific example (a non-exclusive list) of the computer readable medium includes the following: an electronic connection portion (electronic device), a portable computer cassette (magnetic device), a random access memory (RAM), a read-only memory (ROM), an erasable programmable read-only memory (EPROM or flash-drive memory), a fiber device, and a compact disc read-only memory (CDROM) having one or more cables. In addition, the computer readable medium may even be paper or another suitable medium on which the program is printed, because, for example, optical scanning may be performed on the paper or the another medium, the program is then obtained in an electronic manner by means of editing, deciphering or processing in another suitable manner when necessary, and the program is stored in a computer memory.

It would be appreciated that the parts of the present disclosure may be implemented by using hardware, software, firmware or a combination thereof. In the foregoing implementation manner, multiple steps or methods may be implemented by using software or firmware that is stored in a memory and executed by a suitable instruction execution system. For example, during implementation of hardware, as in any another implementation manner, any one or a combination of the following technologies well known in the art may be used for implementation: a discrete logic circuit having a logic gate circuit configured to implement a logic function on a data signal, an application-specific integrated circuit having a suitable combinational logic gate circuit, a programmable gate array (PGA), a field-programmable gate array (FPGA), and the like.

Those skilled in the art may understand that implementation of all or some of the steps carried in the methods in the foregoing embodiments may be accomplished by using a program instructing related hardware, and the program may be stored in a computer readable store medium. When the program is run, one or a combination of the steps in the method embodiments is included.

In addition, various functional units in various embodiments of the present disclosure may be integrated in one processing module, or various units may exist separately in a physical form, or two or more units may be integrated in one module. The foregoing integrated module may be implemented in the form of hardware, or may be implemented in the form of a software function module. When the integrated module is implemented in the form of a software functional module and sold or used as an independent product, the integrated module may be stored in a computer-readable storage medium.

The storage medium mentioned in the foregoing may be a read-only memory, a disk, a disc or the like.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in an embodiment," "in some embodiments", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that various changes, modifications, replacements and alternatives can be made to the embodiments without departing from the principles and spirit of the present disclosure, and the scope of the present disclosure is as defined by the appended claims and equivalents thereof.

What is claimed is:

1. A cruise control method for a vehicle, wherein the vehicle comprises an engine unit, a transmission unit adapted to selectively couple with the engine unit and configured to transmit power generated by the engine unit, a first motor generator coupled with the transmission unit, an output unit, a power switching device, a second motor generator configured to drive front wheels and/or rear wheels, and a power battery supplying power to the first motor generator and/or the second motor generator, wherein the output unit is configured to transmit the power transmitted by the transmission unit to at least one of the front and rear wheels of the vehicle, the power switching device is adapted to enable or interrupt power transmission between the transmission unit and the output unit, and the cruise control method comprises the following steps:

when a signal for the vehicle to enter cruise control is detected, determining whether the vehicle meets one or more preset cruise control conditions;

if the vehicle meets the one or more preset cruise control conditions, controlling the vehicle according to a current operating mode of the vehicle to enter a corresponding cruise mode, wherein when the current operating mode of the vehicle is an EV mode, the vehicle is controlled to enter an EV cruise mode, and when the current operating mode of the vehicle is an HEV mode, the vehicle is controlled to enter an HEV cruise mode; and during the HEV cruise mode, switching a primary power output source to drive the vehicle and a compensatory power output source to compensate insufficient torque of the primary power output source between the engine unit and the second motor power generator based on a current state of charge (SOC) of the power battery so as to maintain the HEV cruise mode.

2. The cruise control method for a vehicle according to claim 1, wherein the one or more preset cruise control conditions comprise:

(1) a current speed of the vehicle is greater than or equal to a preset cruise speed lower limit value and is less than or equal to a preset cruise speed upper limit value;
(2) a current gear of the vehicle is gear D;
(3) a braking pedal of the vehicle is not triggered;
(4) a cruise control switch of the vehicle is in a normal state;
(5) a speed signal of the vehicle is in a normal state;
(6) a braking signal of the vehicle is in a normal state;
(7) an accelerator pedal signal of the vehicle is in a normal state;
(8) an electrical park brake (EPB) system of the vehicle does not request to cancel cruise control of the vehicle;
(9) an electronic stability program (ESP) system of the vehicle is not executed;
(10) the EPB/ESP of the vehicle has no failure; and
(11) communication with the EPB/ESP has no failure.

3. The cruise control method for a vehicle according to claim 2, wherein when the vehicle is in the cruise mode, if any condition of the one or more preset cruise control conditions is not met or a signal for the vehicle to exit cruise control is detected, the vehicle is controlled to exit the corresponding cruise mode.

4. The cruise control method for a vehicle according to claim 1, when the vehicle is in the EV cruise mode the method comprising:
if a current state of charge (SOC) of the power battery is greater than a first electric quantity threshold value, a maximum allowable discharge power of the power battery is greater than a preset power threshold value, and a current slope of the vehicle is less than a slope threshold value, calculating a required torque of the vehicle, and controlling the second motor generator to output the required torque, and when an output torque upper limit of the second motor generator is less than the required torque, controlling the first motor generator to perform torque compensation output; and
if a current SOC of the power battery is less than or equal to a first electric quantity threshold value, a maximum allowable discharge power of the power battery is less than or equal to a preset power threshold value or the current slope of the vehicle is greater than or equal to a slope threshold value, controlling the engine unit to start, and controlling the vehicle to enter the HEV cruise mode.

5. The cruise control method for a vehicle according to claim 1, wherein when the vehicle enters the HEV cruise mode, a required torque of the vehicle is calculated, and the method comprises:
if a current SOC of the power battery is less than a second electric quantity threshold value and an output torque upper limit of the engine unit is greater than the required torque, controlling the engine unit to output the required torque, and when the vehicle is running in an economical mode, controlling the engine unit to drive the first motor generator to generate electricity; and
if the output torque upper limit of the engine unit is less than the required torque, controlling the second motor generator and the first motor generator to successively perform torque compensation output.

6. The cruise control method for a vehicle according to claim 5, wherein
if the current SOC of the power battery is greater than or equal to the second electric quantity threshold value and is less than or equal to a third electric quantity threshold value and the output torque upper limit of the engine unit is greater than the required torque, the engine unit is controlled to output the required torque, wherein the third electric quantity threshold value is greater than the second electric quantity threshold value; and
if the output torque upper limit of the engine unit is less than the required torque, the second motor generator and the first motor generator are controlled to successively perform torque compensation output.

7. The cruise control method for a vehicle according to claim 5, wherein
if a current SOC of the power battery is greater than a third electric quantity threshold value and an output torque upper limit of the second motor generator is greater than the required torque, the second motor generator is controlled to output the required torque; and
if the output torque upper limit of the second motor generator is less than the required torque, the engine unit and the first motor generator are controlled to successively perform torque compensation output.

8. The cruise control method for a vehicle according to claim 1, further comprising during the HEV cruise mode, switching driving or non-driving of the first motor power generator by the engine unit based on an output torque upper limit of the engine unit.

9. The cruise control method for a vehicle according to claim 1, further comprising during the EV cruise mode, switching output or non-output of power from the first motor power generator for torque compensation based on an output torque upper limit of the second motor power generator.

10. A vehicle, comprising:
an engine unit;
a transmission unit adapted to selectively couple with the engine unit and configured to transmit power generated by the engine unit;
a first motor generator coupled with the transmission unit;
an output unit configured to transmit the power transmitted by the transmission unit to at least one of front and rear wheels of the vehicle;
a power switching device adapted to enable or interrupt power transmission between the transmission unit and the output unit;
a second motor generator configured to drive the front wheels or the rear wheels;
a power battery, connected to the first motor generator and/or the second motor generator to supply power to the first motor generator and/or the second motor generator; and
a controller, wherein
when a signal for the vehicle to enter cruise control is detected, the controller determines whether the vehicle meets one or more preset cruise control conditions,
when the vehicle meets the one or more preset cruise control conditions, the controller controls the vehicle according to a current operating mode of the vehicle to enter a corresponding cruise mode, wherein when the current operating mode of the vehicle is an EV mode, the controller controls the vehicle to enter an EV cruise mode, and when a current operating mode of the vehicle is an HEV mode, the controller controls the vehicle to enter an HEV cruise mode, and
during the HEV cruise mode, the controller is configured to switch a primary power output source to drive the vehicle and a compensatory power output source to compensate insufficient torque of the primary power output source between the engine unit and the second motor power generator based on a current state of charge (SOC) of the power battery so as to maintain the HEV cruise mode.

11. The vehicle according to claim 10, wherein the one or more preset cruise control conditions comprise:
   (1) a current speed of the vehicle is greater than or equal to a preset cruise speed lower limit value and is less than or equal to a preset cruise speed upper limit value;
   (2) a current gear of the vehicle is gear D;
   (3) a braking pedal of the vehicle is not triggered;
   (4) a cruise control switch of the vehicle is in a normal state;
   (5) a speed signal of the vehicle is in a normal state;
   (6) a braking signal of the vehicle is in a normal state;
   (7) an accelerator pedal signal of the vehicle is in a normal state;
   (8) an electrical park brake (EPB) system of the vehicle does not request to cancel cruise control of the vehicle;
   (9) an electronic stability program (ESP) system of the vehicle is not executed;
   (10) the EPB/ESP of the vehicle has no failure; and
   (11) communication with the EPB/ESP has no failure.

12. The vehicle according to claim 11, wherein when the vehicle is in the cruise mode, if any condition of the one or more preset cruise control conditions is not met or a signal for the vehicle to exit cruise control is detected, the vehicle is controlled to exit the corresponding cruise mode.

13. The vehicle according to claim 10, wherein when the vehicle is in the EV cruise mode, wherein
   if a current SOC of the power battery is greater than a first electric quantity threshold value, a maximum allowable discharge power of the power battery is greater than a preset power threshold value, and a current slope of the vehicle is less than a slope threshold value, the controller calculates a required torque of the vehicle, the second motor generator is controlled to output the required torque, and when an output torque upper limit of the second motor generator is less than the required torque, the first motor generator is controlled to perform torque compensation output; or
   if a current SOC of the power battery is less than or equal to a first electric quantity threshold value, a maximum allowable discharge power of the power battery is less than or equal to a preset power threshold value or the current slope of the vehicle is greater than or equal to a slope threshold value, the controller controls the engine unit to start, and controls the vehicle to enter the HEV cruise mode.

14. The vehicle according to claim 10, wherein when the vehicle enters the HEV cruise mode, the controller calculates a required torque of the vehicle, wherein
   if a current SOC of the power battery is less than a second electric quantity threshold value and an output torque upper limit of the engine unit is greater than the required torque, the controller controls the engine unit to output the required torque, and when the vehicle is running in an economical mode, the engine unit is controlled to drive the first motor generator to generate electricity; and
   if the output torque upper limit of the engine unit is less than the required torque, the controller controls the second motor generator and the first motor generator to successively perform torque compensation output.

15. The vehicle according to claim 14, wherein
   if the current SOC of the power battery is greater than or equal to the second electric quantity threshold value and is less than or equal to a third electric quantity threshold value, and the output torque upper limit of the engine unit is greater than the required torque, the controller controls the engine unit to output the required torque, wherein the third electric quantity threshold value is greater than the second electric quantity threshold value; and
   if the output torque upper limit of the engine unit is less than the required torque, the controller controls the second motor generator and the first motor generator to successively perform torque compensation output.

16. The vehicle according to claim 14, wherein
   if the current SOC of the power battery is greater than a third electric quantity threshold value and an output torque upper limit of the second motor generator is greater than the required torque, the controller controls the second motor generator to output the required torque; and
   if the output torque upper limit of the second motor generator is less than the required torque, the controller controls the engine unit and the first motor generator to successively perform torque compensation output.

17. The vehicle according to claim 10, wherein the controller is further configured to switch driving or non-driving of the first motor power generator by the engine unit based on an output torque upper limit of the engine unit during the HEV cruise mode.

18. The vehicle according to claim 10, wherein the controller is further configured to switch output or non-output of power from the first motor power generator for torque compensation based on an output torque upper limit of the second motor power generator during the EV cruise mode.

19. A cruise control method for a vehicle, comprising:
   detecting a signal for the vehicle to enter cruise control;
   determining a current operating mode of the vehicle; and
   if it is determined that the vehicle is operating in an electric vehicle (EV) mode, controlling the vehicle to enter an EV cruise mode, and if it is determined that the vehicle is operating in a hybrid electric vehicle (HEV) mode, controlling the vehicle to enter an HEV cruise mode; and
   during the HEV cruise mode, switching a primary power output source to drive the vehicle and a compensatory power output source to compensate insufficient torque of the primary power output source between an engine and a motor power generator based on a current SOC of a power battery so as to maintain the HEV cruise mode.

20. The cruise control method for a vehicle according to claim 19, further comprising during the HEV cruise mode, switching driving and non-driving of a secondary motor power generator by the engine based on an output torque upper limit of the engine unit.

* * * * *